United States Patent [19]

Weaver et al.

[11] 4,282,144
[45] Aug. 4, 1981

[54] AZO DYES DERIVED FROM 5-MEMBERED HETEROCYCLIC AMINES AND AROMATIC AMINE COUPLERS CONTAINING SULFO GROUPS, OR SALTS THEREOF

[75] Inventors: Max A. Weaver; Clarence A. Coates, Jr.; Jean C. Fleischer, all of Kingsport, Tenn.

[73] Assignee: Eastman Kodak Company, Rochester, N.Y.

[21] Appl. No.: 44,446

[22] Filed: Jun. 1, 1979

[51] Int. Cl.³ ............... C09B 29/22; C09B 31/14; C09B 31/28; C09B 62/08
[52] U.S. Cl. ............... 260/152; 260/158; 260/162; 260/163; 260/155
[58] Field of Search ............... 260/152, 155, 158, 162, 260/163

[56] References Cited

U.S. PATENT DOCUMENTS

| | | | |
|---|---|---|---|
| 3,221,006 | 11/1965 | Moore | 260/158 |
| 3,585,182 | 6/1971 | Straley | 260/158 |
| 3,639,384 | 2/1972 | Weaver | 260/158 |
| 3,762,861 | 10/1973 | Weaver et al. | 260/158 |
| 3,870,696 | 3/1975 | Feeman | 260/158 |
| 4,063,881 | 12/1977 | Razavi | 260/158 |

Primary Examiner—John F. Niebling
Attorney, Agent, or Firm—Daniel B. Reece, III; Donald W. Spurrell

[57] ABSTRACT

Disclosed are mono azo dyes derived from diazotized 5-membered heterocyclic amines and certain aniline, 1,2,3,4-tetrahydroquinoline, and benzomorpholine couplers containing sulfoalkyl groups. These dyes impart fast violet to blue shades on polyamide fibers and have the general formula

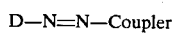

D—N=N—Coupler wherein D is a thiadiazol, isothiazol, pyrazol or thiophene type radical, and the Coupler is an aniline, tetrahydroquinoline, or benzomorpholine derivative wherein a —Z—SO₃M group is attached to the nitrogen thereof, the coupler ring may contain one or more substituents selected from lower alkyl, lower alkoxy, halogen, acylamido, alkylthio or aryloxy, the remaining hydrogen of the aniline coupler may be replaced by a substituent such as lower alkyl, substituted lower alkyl, lower alkenyl, aryl, or cycloalkyl, M is $Na^+$, $K^+$, $NH_4^+$ or $H^+$, and Z is a linking group such as ethylene.

12 Claims, No Drawings

AZO DYES DERIVED FROM 5-MEMBERED HETEROCYCLIC AMINES AND AROMATIC AMINE COUPLERS CONTAINING SULFO GROUPS, OR SALTS THEREOF

This invention concerns mono azo dyes derived from diazotized 5-membered heterocyclic amines and certain aniline, 1,2,3,4-tetrahydroquinoline, and benzomorpholine couplers containing sulfoalkyl groups. These dyes are useful for dyeing synthetic fibers, cellulose acetate and wool, and particularly impart fast violet to blue shades on polyamide fibers. The dyes, in general, exhibit improved properties such as fastness to light, sublimation, ozone, oxides of nitrogen, perspiration, crock, and wash, and exhibit excellent build, pH stability, bloom resistance, depth of shade, leveling, migration, and the like.

The dyes of this invention have the general formula:

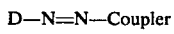

wherein D is a thiadiazol, isothiazol, pyrazol or thiophene type radical, and the Coupler is an aniline, tetrahydroquinoline, or benzomorpholine derivative wherein a $-Z-SO_3M$ group is attached to the nitrogen thereof, the coupler ring may contain a substituent such as lower alkyl, lower alkoxy, halogen, acylamido, alkylthio or aryloxy, the remaining hydrogen of the aniline coupler may be replaced by a substituent such as lower alkyl, substituted lower alkyl, lower alkenyl, aryl, or cycloalkyl, M is $Na^+$, $K^+$, $NH_4^+$ or $H^+$, and Z is a linking group such as ethylene.

More specifically, the Coupler is of the formulae

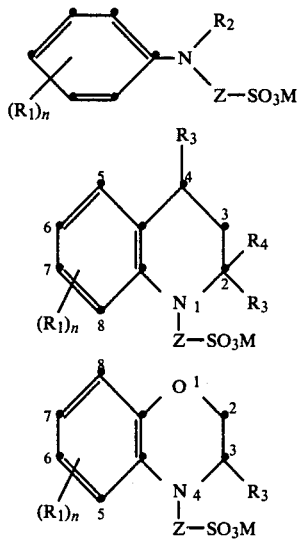

wherein; $R_1$ is selected from hydrogen, lower alkyl, halogen, lower alkoxy, aryloxy, and $-NHCO-R_5$ or $-NHSO_2-R_5$ wherein $R_5$ is selected from lower alkyl which may be substituted with hydroxy, lower alkoxy, cyano, aryloxy, aryl, halogen, cycloalkyl, lower alkyl carbonyloxy, or carbamoyl; hydrogen; aryl; alkoxy; alkylamino; and 2-furyl; $R_2$ is selected from hydrogen, aryl, cycloalkyl, and lower alkyl which may be substituted with alkoxy, alkoxyalkoxy, hydrogen, aryloxy, aryl, cycloalkyl, lower alkylcycloalkyl, furyl, acylamido, aryloxy, carbamoyl, lower alkoxy carbamoyl, lower alkyl substituted carbamoyl, cyano, alkanoyloxy, halogen, alkoxycarbonyl, succinimido, glutarimido, phthalimido, 2-pyrrolidino, sulfamoyl, lower alkyl substituted sulfamoyl, lower alkylsulfonamido, $NHSO_2$-aryl, NHCOO-alkyl, NHCONH-alkyl, formamido, alkylsulfonyl, arylsulfonyl, alkylthio, arylthio or $SO_3M$; $R_2$ may in conjunction with $R_1$ form a 1,2,3,4-tetrahydroquinoline or benzomorpholine derivative; n is 0, 1 or 2; M is $Na^+$, $K^+$, $NH_4^+$, or $H^+$; $R_3$ and $R_4$ are each selected from hydrogen or lower alkyl; Z is selected from straight or branched chain lower alkylene, lower alkylene substituted with aryl, aryloxy, alkoxy, halogen, aryloxy or $SO_3M$, $-CH_2(CH_2)_m-X-CH_2(CH_2)_p$-, where m is 1, 2, or 3, p is 0, 1, 2 or 3, and X is O, S, $SO_2$, $$-SO_2NH-,\ -SO_2N-alkyl,\ -N-SO_2-alkyl,$$
$$-N-SO_2-aryl,\ -N-SO_2-cyclohexyl,\ -NCO-alkyl,$$
$$-NHCO-,\ -NHCOO-,\ -N(alkyl)-CO-,\ -N(aryl)-SO_2-,$$
$$\text{or}\ -NHCNH-;\ (\text{with } =O)$$

and the various aryl groups may be substituted with lower alkyl, lower alkoxy, or halogen. The term "lower" as used through this application means 1–6 carbons.

The heterocycle D is of the formulae

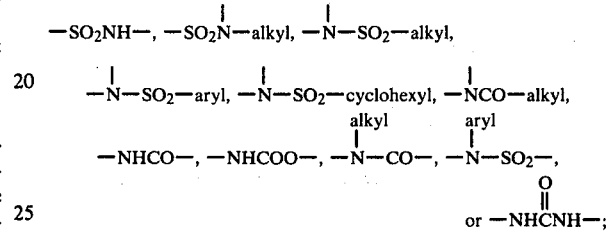

1,3,4-thiadiazol-2-yl, 1,2,4-thiadiazol-5-yl, isothiazol-5-yl, pyrazol-5-yl, and thiophen-2-yl, wherein

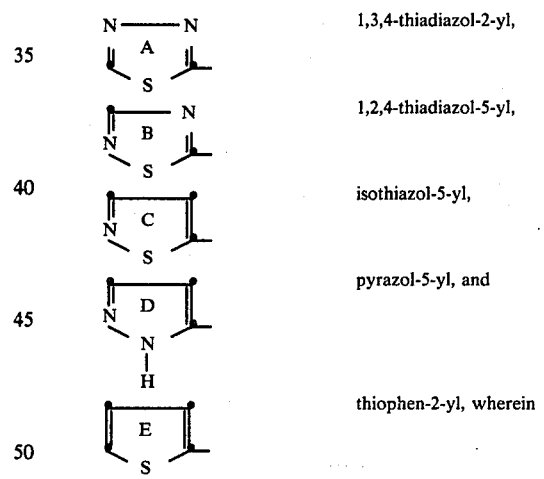

ring A may bear a substituent selected from lower alkyl, substituted lower alkyl, lower alkoxy, halogen, lower alkylsulfonyl, $SO_2O$ aryl, $SO_2NH_2$, $SO_2NH$—lower alkyl, $SO_2N$—(dilower alkyl), arylsulfonyl, substituted $SO_2NH$—lower alkyl, acylamido, aryl, arylthio, alkenylthio, cyclohexylthio, thiocyano, cyclohexylsulfonyl, lower alkylthio, substituted lower alkylthio and cyclohexyl;

ring B may bear a substituent selected from lower alkyl, substituted lower alkyl, aryl, lower alkylthio, cyclohexylthio, substituted lower alkylthio and lower alkylsulfonyl;

ring C may bear one or two substituents selected from alkyl, substituted lower alkyl, halogen, cyano, carbamoyl, CONH—lower alkyl, substituted CONH—lower alkyl, lower alkoxycarbonyl, lower alkylthio, substituted lower alkylthio, alkenylthio, arylthio, cyclohexylthio, S-heterocycle, aryloxy, and lower alkoxy;

ring D may bear one or two substituents selected from lower alkyl, substituted lower alkyl, lower alkoxycarbonyl, lower alkylthio, aryl, cyano, carbamoyl, lower alkyl carbamoyl, lower alkylcarbonyl, substituted lower alkyl carbamoyl, and lower alkyl sulfonyl; and ring E may be substituted with one to three substituents selected from lower alkyl, substituted lower alkyl, cyano, lower alkoxycarbonyl, acyl, aroyl, lower alkylsulfonyl, arylsulfonyl, carbamoyl, lower alkyl carbamoyl, substituted lower alkyl carbamoyl, aryl, halogen, sulfamoyl, lower alkyl carbamoyl, substituted lower alkyl, sulfamoyl and formyl;

and wherein the various alkyl groups may bear one to three substituents selected from hydroxy, lower alkoxy, aryl, aryloxy, cyclohexyl, lower alkylcyclohexyl, acyloxy, lower alkoxy carbonyl, acylamido, lower alkylsulfonamido, succinimido, glutarimido, phthalimido, 2-pyrrolidino, cyano, carbamoyl, lower alkoxy-alkoxy, lower alkylthio, halogen, arylthio, lower alkylsulfonyl and arylsulfonyl;

and wherein the various aryl groups may be substituted with one to three substituents selected from lower alkyl, lower alkoxy, halogen, lower alkoxy carbonyl, lower alkyl sulfonyl, and lower alkylthio.

The following couplers are particularly valuable in the practice of this invention.

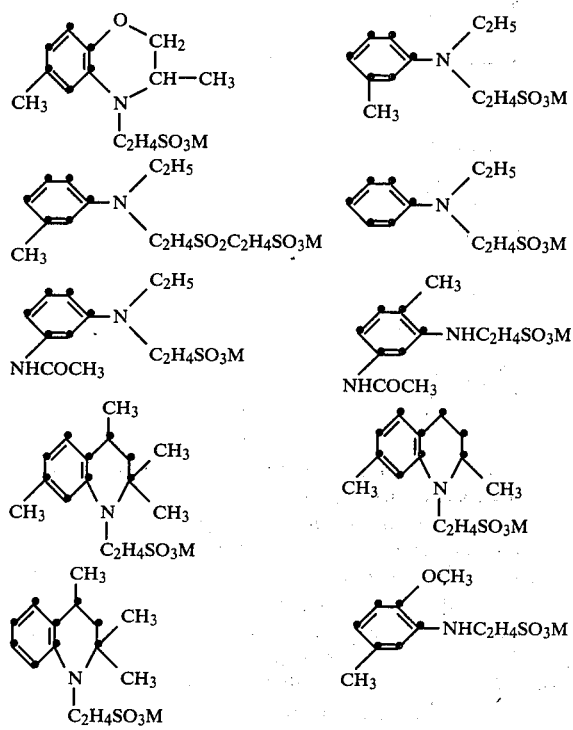

The intermedite couplers containing a sulfoethyl group may be prepared in the best purity by reacting aromatic amines such as anilines, tetrahydroquinolines and benzomorpholines with vinylsulfonyl fluoride, followed by basic hydrolysis. Typical is the reaction

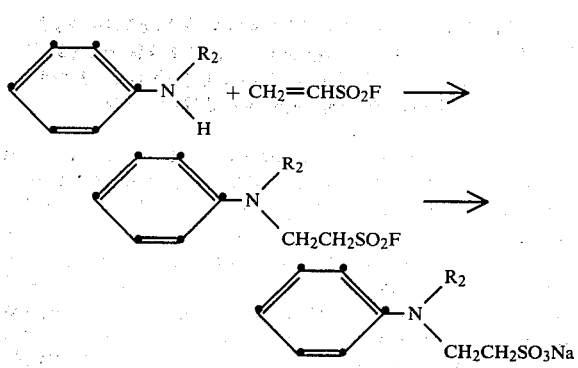

Other general methods useful for preparing these couplers containing sulfo groups are given by R. B. Wagner and H. D. Zook, "Synthetic Organic ChemistryS", John Wiley & Sons, Inc., New York, 1953, pp. 812–819. Exemplary are the methods (I) oxidation of mercaptans; (II) alkylation of alkali sulfite; and (III) addition of bisulfites to unsaturated compounds, as follows:

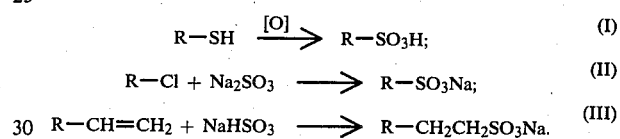

The following coupler intermediates, bearing one or more hydrogens, are typical of those appropriate for reacting with sodium sulfite according to above method II.

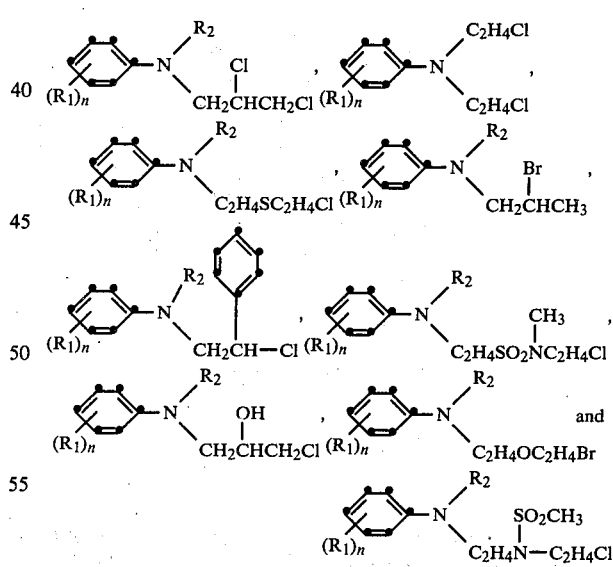

The halogen containing couplers are in general prepared by reacting the corresponding known hydroxy compounds with $POCl_3$, $SOCl_2$, $POBr_3$, $PBr_3$, and the like by methods well known in the art. The tetrahydroquinolines and benzomorpholines are similarly prepared.

The following coupler intermediates are typical of those containing vinyl groups capable of being reacted with sodium bisulfide method III as disclosed, for example, in U.S. Pat. Nos. 3,369,013; 3,415,810; and 3,472,833.

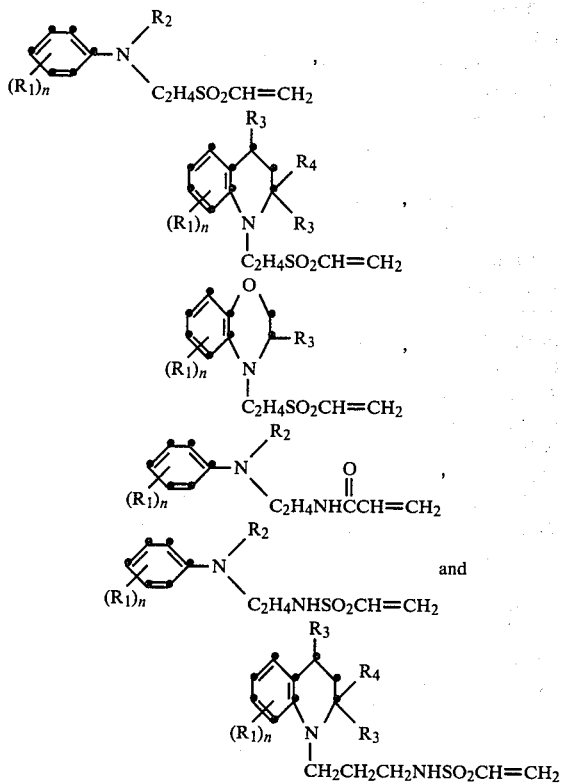

Intermediates containing the acrylamide and vinylsulfonamido groups can be prepared by reacting the corresponding amino compound with acryloyl chloride and vinylsulfonyl fluoride, respectively by methods well known in the art.

Preparation of N-(2-Fluorosulfonylethyl)-N-ethyl-m-toluidine

N-Ethyl-m-toluidine (66.5 g) (0.05 m) is dissolved in isopropyl alcohol (75 ml) and vinylsulfonyl fluoride (55 g 0.5) is added dropwise over 1.25 hr. The reaction exotherms to 38° C. and the reaction mixture is stirred for 1 hr. at ambient temperature and drowned into 500 ml of ice and water. The product is collected by filtration, washed with water, and dried in air. The product melts at 32°–34° C.

Preparation of N-(2-Potassiousulfoethyl)-N-ethyl-m-toluidine

N-(2-Fluorosulfonylethyl)-N-ethyl-m-toluidine (24.5 g., 0.1 m) is stirred in water (200 ml) and potassium hydroxide (10 g) for 1-3 hours at room temperature or until thin-layer chromatography shows the reaction to be complete. The product is not isolated but is used as an aqueous solution in the coupling reaction.

Preparation of N-(2-Fluorosulfonylethyl)-N-ethylaniline

N-Ethylaniline (48.4 g 0.4 m), triethylamine (40.4 g 0.4 m) and benzene (100 ml) are stirred together at room temperature and 2-chloroethanesulfonyl fluoride (58.6 g, 0.4 m) is added dropwise. The reaction mixture is heated at reflux for 1.5 hr. after the addition is completed. The reaction mixture is cooled and filtered to remove any insoluble salts, and the benzene is removed by distillation. The crude product is drowned into hexane (150 ml) and purified by filtration and washing with hexane. The product melts at 48°–50° C.

Preparation of N-(2-Potassiosulfoethyl)-N-ethylaniline

N-(2-Fluorosulfonylethyl)-N-ethylaniline (22.8 g, 0.1 n) is stirred in water (200 ml) and potassium hydroxide (10 g) for 1–3 hrs. or until thin-layer chromatography shows reaction to be complete. The product is not isolated but is used as an aqueous solution in the coupling reaction.

Preparation of N-(2-Fluorosulfonylethyl)-2-methyl-5-acetamidonaniline

2-Methyl-5-acetamido aniline (49.2 g, 0.3 m), triethyl amine (32.7 g 0.3 m) and p-dioxane (350 ml) are stirred together at room temperature. 2-Chloroethane sulfonyl fluoride (43.0 g, 0.3 m) is added dropwise allowing temperature to rise to 45° C. The reaction mixture is then heated at reflux for 3 hrs. When thin-layer chromatography shows reaction to be complete, the reaction is allowed to cool and then drowned into water (2000 ml). The product is collected by filtration, washed with water and melts at 154°–155° C.

Preparation of N-(2-Potassiosulfoethyl)-2-methyl-5-acetamido aniline

N-(2-Fluorosulfonylethyl-2-methyl-5-acetamidoaniline (13.7 g, 0.05 m) is stirred with water (100 ml.) and potassium hydroxide (5.0 g) at room temperature for 2 hrs. when thin-layer chromatography shows reaction to be complete. The aqueous solution is used in the coupling reaction without further isolation.

Preparation of N-(2-Fluorosulfonylethyl)-2-methoxy-5-methylaniline

2-Methoxy-5-methylaniline (34.3 g 0.25 m) is dissolved in N,N-dimethylformamide (50 ml). Vinylsulfonyl fluoride (28.0 g, 0.26 m) is added dropwise at 20°–30° C. After the addition is complete the reaction mixture is allowed to stir at ambient temperature for 1 hr. The reaction is drowned into water (400 ml)., the product collected by filtration, washed with water and air dried. The product melts at 56°–58° C. The corresponding N-(2-potassiosulfoethyl)-2-methoxy-5-methylaniline is prepared therefrom by the above technique using KOH.

Preparation of N-(2-Fluorosulfonylethyl)-2,2,4,7-tetramethyl 1,2,3,4-tetrahydroquinoline 2,2,4,7-Tetramethyl-1,2,3,4-tetrahydroquinoline (94.5 g, 0.5 m) is dissolved in acetic acid (200 ml). The reaction is heated to 50° C. and vinylsulfonylfluoride (44.0 g, 0.5 m) added over 30 min. at 48°–50° C. The reaction is then stirred and heated for 2.5 hr. at 50°–55° C. Thin-layer chromatography shows the reaction to be complete. The reaction mixture is drowned into water (1200 ml), the product collected by filtration, washed with water and air dried. The product melts at 67°–69° C.

N-(2-fluorosulfonylethyl)-2,2,4-trimethyl-1,2,3,4-tetrahydroquinoline and N-(2-fluorosulfonylethyl 2,7-dimethyl-1,2,3,4-tetrahydroquinoline is prepared in same manner.

Preparation of N-(2-Sodiosulfoethyl)-2,2,4,7-tetramethyl-1,2,3,4-tetrahydroquinoline N-(2-fluorosulfonylethyl)-2,2,4,7-tetramethyl-1,2,3,4-tetrahydroquinoline (12.0 g, 0.04 m) is stirred with water (100 ml) and sodium hydroxide (5.0 g(, warmed to 50° C. for 30 min., allowed to come to room temperature and stirred for 1.5 hr. Thin layer chromatography shows the reaction to be complete. The aqueous solution is not isolated but is used in the coupling reaction.

The same process is used to prepare N-(2-potassiosulfoethyl)-2,2,4-trimethyl-1,2,3,4-tetrahydroquinoline and N-(2-potassiosulfoethyl)-2,7-dimethyl-1,2,3,4-tetrahydroquinoline using KOH as the base.

Preparation of N-(2-Flourosulfonylethyl)-3,6-dimethyl-2,3-dihydro-1,4-benzoxazine 3,6-Dimethyl-2,3-dihydro-1,4-benzoxazine (16.3 g, 0.1 m) is dissolved in acetic acid (40 ml) at ambient temperature and vinylsulfonylfluoride (11 g., 0.1 m) is added dropwise at 25°–35° C. After stirring for 1.5 hr., the reaction is complete. The reaction is drowned into water (400 ml). The dark oil which separates is extracted with hexane (1200 ml) and the hexane solution dried over sodium sulfate. The sodium sulfate is removed and the hexane distilled off to yield 23.3 g. of oily product. The N-2(Potassiosulfoethyl)-3,6-dimethyl-2,3-dihydro-1,4-benzoxazine is prepared as above using KOH.

Preparation of N-(2-Fluorosulfonylethyl)-N-ethyl-m-acetamidoaniline

N-ethyl-m-acetamidoaniline (178.0 g, 1.0 m is dissolved in isopropyl alcohol (450 ml) and vinylsulfonylfluoride (110 g, 1.0 m) is added dropwise allowing temperature to rise to 40° C. The reaction is stirred for 2.5 hrs., the product collected by filtration, washed with cold ethanol and air dried.

Preparation of N-(2-Sodiosulfoethyl)-sulfonylethyl-N-ethyl-m-toluidine

N-(2-vinylsulfonylethyl-N-ethyl-m-toluidine (25.3 g, 0.1 m) in water solution (100 ml) is stirred with sodium bisulfite (11.0 g, 0.1 m). The reaction is heated to reflux and held for 15 min. The clear solution is drowned into ethanol (200 ml) and allowed to cool. The white solid is collected by filtration, air dried and melts at 237°–240° C.

Vinylsulfonyl fluoride may be prepared according to U.S. Pat. Nos. 2,653,973 and 2,884,452 and L. Z. Soboronskii, et. al., J. Gen. Chem. U.S.S.R., 28, 1913 (1958).

The amine diazo precursors can be prepared from readily available intermediates by well known techniques.

This invention will be further illustrated by the following examples although it will be understood that these examples are included merely for purposes of illustration and are not intended to limit the scope of the invention.

EXAMPLES 1–10

Diazotization and Coupling of 2-Amino-5-ethylthio-1,3,4-thiadiazole

Sodium nitrite (3.6 g.) is added portionwise to 25 ml of concentrated $H_2SO_4$. The solution is cooled and 100 ml of 1:5 acid (1 part propionic: 1 part acetic) is added below 15° C. The mixture is cooled and 8.05 g. (0.05 m) of 2-amino-5-ethylthio-1,3,4-thiadiazole is added below 10° C. After stirring at 0°–5° C. for 2 hrs., a 0.005 m aliquot of the diazonium salts is added to 0.005 m of the following couplers in water or dilute sulfuric acid, keeping the temperature below 5° C.

N-Ethyl-N-2-sulfoethyl-m-toluidine, K salt (Example 1)
N-Ethyl-N-sulfoethyl-2-methoxy-5-methylaniline, K salt (Example 2).
5-Acetamido-2-methyl-N-sulfoethyl aniline, K salt (Example 3).
N-(2-Sulfoethyl)-1,2,3,4-tetrahydro-2,2,4,7-tetramethyl quinoline, K salt (Example 4)
N-(2-Sulfoethyl)-1,2,3,4-tetrahydro-2,2,4-trimethyl quinoline, K salt (Example 5)
2,7-Dimethyl-N-(2-sulfoethyl)-1,2,3,4-tetrahydroquinoline, K salt (Example 6)
8-Methoxy-5-methyl-N-(2-sulfoethyl)-1,2,3,4-tetrahydro quinoline, K salt (Example 7)
2,7-Dimethyl-N-(2,3-disulfopropyl)-1,2,3,4-tetrahydro quinoline, K salt (Example 8)
2,3-Dihydro-3,6-dimethyl-N-(2-sulfoethyl)-1,4-benzoxazine, K salt (Example 9)
2,3-Dihydro-3-methyl-7-methoxy-N-(2-sulfoethyl)-1,4-benzoxazine, K salt (Example 10)

The mineral acid is neutralized with potassium acetate and the coupling mixture allowed to stand for 1 hr. Water is added to make a total volume of 200–300 ml. and the dyes are collected by filtration, washed with water, and dried in air.

The dyes usually contain about an equal weight of dye and potassium sulfate as they are isolated and are used for dying polyamide fibers red shades without further purification. The dyes in the following tables are prepared in a similar manner. Neutralization using sodium hydroxide and ammonium hydroxide results in the corresponding sodium and ammonium salts, respectively.

TABLE 1

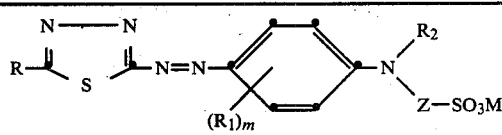

| R | $(R_1)_m$ | $R_2$ | Z | M |
|---|---|---|---|---|
| 5-$CH_3$ | 2-$CH_3$ | H | —$CH_2CH_2$— | $K^+$ |
| 5-$CH_2CH_3$ | 2-Cl | " | " | " |
| 5-$CH_2CH(CH_3)$ | 2,5-di-Cl | " | " | " |
| 5-$C_6H_5$ | 2,5-di-$CH_3$ | " | " | " |
| 5-$C_6H_{11}$ | 2,5-di-$OCH_3$ | " | " | " |
| 5-$C_6H_4$—p-Cl | 3-$OCH_3$ | —$C_2H_5$ | " | " |
| 5-$C_6H_4$—o-$CH_3$ | 2-$OCH_3$, 5-NHCOCH$_3$ | H | " | " |
| 5-$C_6H_4$—m-$OCH_3$ | 2-$CH_3$, 3-Cl | " | " | " |

TABLE 1-continued $$R-\underset{S}{\overset{N---N}{\swarrow}}-N=N-\underset{(R_1)_m}{\overset{}{\bigcirc}}-N\overset{R_2}{\underset{Z-SO_3M}{}}$$

| R | (R₁)ₘ | R₂ | Z | M |
|---|---|---|---|---|
| 5-SCH₃ | 2-OCH₃, 5-Cl | " | " | " |
| " | 3-NHCOCH₃ | —C₂H₅ | " | " |
| " | 3-NHCOC₂H₅ | —C₂H₄OCH₃ | " | " |
| " | 3-NHCOCH₂OH | —CH₂C₆H₅ | " | " |
| " | 3-NHCOCH₂OCH₃ | —C₆H₁₁ | " | " |
| " | 3-NHCOC₆H₅ | —CH₂C₆H₁₁ | " | " |
| " | 3-NHCOOC₂H₅ | —CH₂CH₂OC₆H₅ | " | " |
| " | 3-NHCONHC₂H₅ | —CH₂CH₂OH | " | " |
| 5-OC₂H₅ | 3-NHCOC₆H₁₁ | —CH₂CH(CH₃)₂ | " | " |
| 5-SC₂H₅ | 3-NHCOCH₂CN | —CH₂CH₂CH₂CH₃ | " | " |
| " | 3-NHCOCH₂OC₆H₅ | —CH₂CH₂OCOCH₃ | " | " |
| " | 3-NHCOCH₂C₆H₅ | —CH₂CH₂CONH₂ | " | " |
| " | 3-CH₃ | —CH₂CH₂NHCOCH₃ | " | " |
| " | " | —CH₂CH₂NHSO₂CH₃ | " | " |
| " | " | —CH₂CH₂SO₂NH₂ | " | " |
| " | " | —CH₂CH₂CH₂SO₂CH₃ | " | " |
| 5-Cl | " | —CH₂CH₂SCH₃ | " | " |
| 5-SO₂CH₃ | " | —CH₂CH₂N(COCH₂)₂ (succinimide) | —CH₂CH₂CH₂— | Na⁺ |
| 5-OC₄H₉—n | " | —CH₂CH₂CH₂N(CO—CH₂)(CH₂CH₂) (pyrrolidone) | " | " |
| 5-SCH₂CH₂OH | 3-OC₆H₅ | —CH₂CH₂N(CO)₂C₆H₄ (phthalimide) | " | NH₄⁺ |
| 5-SCH₂CH₂COOCH₃ | 3-CH₃ | —C₆H₅ | —CH₂CH₂— | Na⁺ |
| 5-S—CH₂CH₂OC(O)CH₃ | " | —CH₂-furyl | —CH₂CH(CH₂OC₆H₅)— | " |
| 5-SCH₂SC₆H₅ | " | —CH₂CH₂COOCH₃ | —CH₂CH(C₆H₅)— | " |
| 5-SO₂CH₃ | " | —CH₂CH₂CN | —CH₂CH(CH₃)— | " |
| 5-SO₂NH₂ | " | —C₂H₅ | —CH₂CH(OH)CH₂— | " |
| 5-SO₂NHC₂H₅ | 2-CH₃S | H | —CH₂CH₂CH₂CH₂— | " |
| 5-SCN | 3-CH₃ | —C₂H₄OC₂H₄OC₂H₅ | —CH₂CH(OCOCH₃)CH₂— | " |
| 5-SO₂N(CH₃)₂ | " | —CH₂CH(OH)CH₂Cl | —CH₂CH₂— | " |
| 5-SO₃C₆H₅ | 2-OCH₃, 5-CH₃ | C₂H₅ | " | " |
| 5-SCH₂CH=CH₂ | " | H | —CH₂CH₂OCH₂CH₂— | " |
| 5-SCH₂CH₂OCH₃ | " | H | " | " |
| 5-SCH₂CH₂N(COCH₂)₂ | " | " | —CH₂CH₂SO₂CH₂CH₂— | K⁺ |
| 5-SC₆H₁₁ | 3-CH₃ | C₂H₅ | —CH₂CH₂SCH₂CH₂— | " |
| 5-SC₆H₅ | " | " | —CH₂CH₂N(SO₂CH₃)CH₂CH₂— | " |
| 5-SO₂C₆H₅ | " | " | —CH₂CH₂NHSO₂CH₂CH₂CH₂CH₂— | " |
| 5-I | " | " | —CH₂CH₂SO₂NHCH₂CH₂— | " |
| 5-Br | " | " | —CH₂CH₂N(COCH₃)CH₂CH₂— | " |
| 5-SCH₂CH₂N(CO—CH₂)(CH₂CH₂) | " | " | —CH₂CH₂CONHC₂H₄— | " |
| 5-SCH₂CH₂NHSO₂CH₃ | " | " | —CH₂CH₂NHCOCH₂— | " |
| 5-SCH₂CH₂NHCOCH₃ | " | " | —CH₂CH₂N(SO₂C₆H₅)CH₂CH₂— | " |
| 5-SCH₂CH₂OC₆H₅ | " | " | —CH₂CH₂SO₂N(CH₃)CH₂CH₂— | " |
| 5-SCH₂CH₂C₆H₅ | " | " | —CH₂CH₂SO₂N(C₆H₅)CH₂CH₂— | " |
| 5-SCH₂CH₂OC₂H₅ | " | " | —CH₂CH₂N(SO₂C₆H₁₁)CH₂CH₂— | " |
| 5-SO₂C₆H₁₁ | " | " | —CH₂CH₂N(COCH₃)CH₂CH₂— | " |
| 5-CH₃ | " | " | —CH₂CH(CH₂OCH₃)— | " |
| " | " | " | —CH₂CH(Cl)CH₂— | " |
| " | " | " | —CH₂CH₂NHCONHC₂H₄— | " |
| 5-NHCOCH₃ | " | " | —CH₂CH₂NHCOOCH₂CH₂— | " |
| " | " | " | —CH₂CH₂COOCH₂CH₂— | " |

TABLE 2

Structure: R-C(=N-N=)-S-C(=N-...)-N=N-[benzene ring with (R₁)ₘ]-fused ring with R₃, R₄, N-Z-SO₃M substituents

| R | (R₁)ₘ | R₃ | R₄ | Z | M |
|---|---|---|---|---|---|
| H | H | CH₃ | CH₃ | —CH₂CH₂— | K⁺ |
| " | 7-CH₃ | " | " | " | " |
| " | 7-OCH₃ | " | " | " | " |
| 5-CH₃ | 7-Cl | " | " | " | " |
| 5-CH₂CH₃ | 5-CH₃, 8-OCH₃ | " | " | " | " |
| 5-CH(CH₃)₂ | 5,8-di-OCH₃ | " | " | " | " |
| 5-CH₂CH(CH₃)₂ | 5,8-di-CH₃ | " | " | " | " |
| 5-C₆H₅ | 5-Cl, 8-OCH₃ | " | " | " | " |
| 5-C₆H₁₁ | 8-OCH₃ | " | " | " | " |
| 5-C₆H₄—o-Cl | 8-OC₂H₅ | H | H | " | " |
| 5-C₆H₄—n-CH₃ | 7-CH₃ | " | " | " | " |
| 5-C₆H₄—p-OCH₃ | 7-NHCOCH₃ | CH₃ | CH₃ | " | Na⁺ |
| 5-OC₂H₅ | 7-NHCOH | " | " | " | " |
| " | 7-NHCOCH₂OCH₃ | " | " | " | " |
| " | 7-NHCOCH₂OC₆H₅ | H | CH(CH₃)₂ | " | " |
| " | 7-NHCOCH₂C₆H₅ | " | " | " | " |
| " | 7-NHCOCH₂Cl | " | " | " | " |
| " | 7-NHCOC₆H₅ | " | " | " | " |
| " | 7-NHCOC₆H₁₁ | CH₃ | CH₃ | " | " |
| 5-Cl | 7-NHCONHC₂H₅ | " | " | " | " |
| " | 7-NHSO₂CH₃ | " | " | " | " |
| " | 7-NHCOCH₂CN | " | " | " | " |
| " | 7-NHCOCH₂OH | " | " | " | " |
| 5-I | 7-NHCOOC₂H₅ | " | " | —CH₂CH₂CH₂— | " |
| 5-Br | 7-NHCOCH₂CH₂OCOCH₃ | " | " | " | " |
| 5-SO₂CH₃ | 8-OC₄H₉—n | H | CH₃ | —CH₂CH₂— | " |
| 5-SO₂NH₂ | 7-CH₃ | CH₃ | H | " | " |
| 5-SO₂N(CH₃)₂ | 7-NHCO-(furan) | " | CH₃ | " | " |
| 5-SO₂N(C₂H₅)₂ | 7-OC₂H₅ | " | " | " | " |
| 8-SO₂NHC₃H₆OCH₃ | 7-OC₄H₉—n | " | " | " | " |
| 5-SO₂CH₂CH₂OC₂H₅ | 7-CH₃ | " | H | " | " |
| 5-SC₆H₅ | " | " | " | " | " |
| 5-SC₆H₁₁ | " | " | " | —CH₂CH₂CH₂CH₂— | " |
| 5-SO₂C₆H₅ | " | " | " | —CH₂CH₂— | " |
| 5-SO₃C₆H₅ | " | " | " | " | " |
| 5-SCH₂CH₂OH | " | " | " | " | " |
| 5-SCH₂CH=CH₃ | " | " | " | —CH₂CH₂SO₂CH₂CH₂— | K⁺ |
| 5-SCH₂COOC₂H₅ | " | " | " | —CH₂CH₂OCH₂CH₂— | " |
| 5-SCH₂C₆H₅ | " | " | " | —CH₂CH₂SCH₂CH₂— | " |
| 5-SCH₂C₆H₁₁ | " | " | " | —CH₂CH(C₆H₅)— | " |
| 5-SCH₂CH₂OC₂H₅ | " | " | " | —CH₂CH(CH₃)— | " |
| 5-SCN | " | " | " | —CH₂CH(OH)CH₂— | " |
| 5-SCH₂CH₂NHCOCH₃ | " | " | " | —CH₂CH(Cl)CH₂— | " |
| 5-SCH₂CH₂N(COCH₂)₂ | " | " | " | —CH₂CH(CH₂OCH₂CH₃)— | " |
| 5-SCH₂CH₂OC₆H₅ | " | " | " | —CH₂CH(CH₂OC₆H₅)— | " |
| 5-SCH₂CH₃ | " | " | " | —CH₂CH₂N(SO₂CH₃)CH₂CH₂— | " |
| " | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| 5-SCH₃ | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| " | " | " | " | —CH₂CH₂SO₂N(C₆H₅)CH₂CH₂— | " |
| 5-NHCOCH₃ | " | " | " | —CH₂CH₂SO₂N(CH₃)CH₂CH₂— | " |

TABLE 3

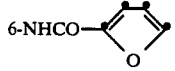

| R | (R₁)ₘ | R₃ | Z | M |
|---|---|---|---|---|
| H | 6-CH₃ | H | —CH₂CH₂— | K⁺ |
| " | H | H | " | " |
| " | " | CH₃ | " | " |
| 5-CH₃ | 6-CH₃ | " | " | " |
| 5-CH(CH₃)₂ | " | " | —CH₂CH₂CH₂CH₂— | " |
| 5-CH₂CH(CH₃)₂ | 6-OCH₃ | " | " | " |
| 5-C₆H₅ | " | " | —CH₂CH₂— | " |
| 5-C₆H₄—p-Cl | 6-CH₃ | " | —CH₂CH₂OCH₂CH₂— | " |
| 5-C₆H₄—p-OCH₃ | " | " | —CH₂CH₂SO₂CH₂CH₂— | " |
| 5-C₆H₄—n-CH₃ | " | " | —CH₂CH₂SCH₂CH₂— | " |
| 5-OC₂H₅ | " | " | —CH₂CH(CH₃) | " |
| 5-OCH(CH₃)₂ | " | " | —CH₂CH(C₆H₅)— | " |
| 5-C₆H₁₁ | 6-OC₂H₅ | " | —CH₂CH₂— | " |
| 5-SCN | 6-NHCOCH₃ | " | " | Na⁺ |
| 5-SCH₃ | 6-NHCOH | " | " | " |
| 5-SCH₂CH(CH₃)₂ | 6-NHCOCH₂CH₂OCH₃ | " | " | " |
| 5-SCH₂CH=CH₂ | 6-NHCOCH₂Cl | " | " | " |
| 5-SC₆H₁₁ | 6-NHCOCH₂CN | " | " | " |
| 5-SC₆H₅ | 6-NHCOCH₂CONH₂ | " | " | " |
| 5-SCH₂C₆H₅ | 6-NHCOCH₂OC₆H₅ | " | " | " |
| 5-SCH₂CH₂OC₆H₅ | 6-NHCOOC₂H₅ | " | " | " |
| 5-SCH₂CH₂OC₂H₅ | 6-NHCONHC₂H₅ | " | " | " |
| 5-SCH₂CH₂OH | 6-NHCOC₆H₅ | " | " | " |
| 5-SCH₂CH₂Cl | 6-NHCOC₆H₁₁ | " | " | " |
| 5-SCH₂COOC₂H₅ | 6-NHSO₂CH₃ | " | " | " |
| 5-SCH₂CH₂OCOCH₃ | 6-NHCOCH₂CH₂OCOCH₃ | " | " | " |
| 5-SCH₂C₆H₁₁ | 6-NHCO-(furan) | " | " | " |
| 5-SO₂CH₃ | 6-NHCOCH₂CH₂CH₂OH | " | " | " |
| 5-SO₂C₄H₉—n | 6-CH₃ | " | —CH₂CH₂CH₂— | " |
| 5-SO₂CH₂CH₂OCH₃ | " | " | —CH₂CH₂— | " |
| 5-SO₂C₆H₅ | " | " | " | " |
| 5-SO₂C₆H₁₁ | " | " | " | " |
| 5-SO₂CH₂C₆H₅ | " | " | " | " |
| 5-SO₂CH₂CH₂OH | " | " | " | " |
| 5-SCH₂CH₂N(COCH₂)₂ | " | " | " | " |
| 5-SCH₂CH₂NHCOCH₃ | " | " | " | " |
| 5-SCH₂CH₂N(CO—CH₂—CH₂—CH₂) (pyrrolidinone) | " | H | —CH₂CH(CH₃)— | " |
| 5-SO₂NH₂ | " | CH₃ | —CH₂CH₂N(SO₂CH₃)CH₂CH₂— | K⁺ |
| 5-SO₂NHC₃H₆OCH₃ | " | " | —CH₂CH₂SO₂NHCH₂CH₂— | " |
| 5-SO₂NH(CH₃)₂ | " | " | —CH₂CH₂SO₂N(CH₃)CH₂CH₂CH₂— | " |
| 5-SO₂NHC₂H₅ | " | " | —CH₂CH₂SO₂N(C₆H₅)CH₂CH₂— | " |
| 5-SO₂NHC₆H₁₁ | " | " | —CH₂CH₂SO₂N(C₆H₁₁)CH₂CH₂— | " |
| 5-SO₃C₆H₅ | " | " | —CH₂CH₂CH₂CH₂N(SO₂CH₃)CH₂CH₂— | " |
| 5-SO₂NHC₆H₅ | " | " | —CH₂CH₂N(SO₂C₆H₄—p-CH₃)—CH₂CH₂— | " |
| 5-NHCOCH₃ | " | " | —CH₂CH₂N(SO₂C₆H₁₁)CH₂CH₂— | " |
| 5-SC₂H₅ | " | " | —CH₂CH(Cl)CH₂— | " |
| " | " | " | —CH₂CH(OH)CH₂— | " |
| " | " | " | —CH₂CH(CH₂OCH₃)— | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂CH₂— | " |
| " | " | " | —CH₂CH₂N(COCH₃)CH₂CH₂— | " |
| " | " | " | —CH₂CH₂N(COC₆H₅)CH₂CH₂— | " |

TABLE 4

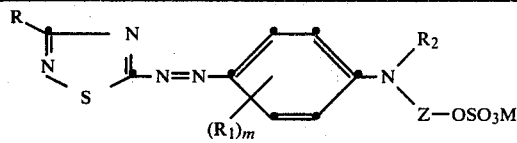

| R | $(R_1)_m$ | $R_2$ | Z | M |
|---|---|---|---|---|
| 3-$CH_3$ | 2-$CH_3$ | H | —$CH_2CH_2$— | $K^+$ |
| " | 2-Cl | " | " | " |
| " | 2,5-di-Cl | " | " | " |
| " | 2,5-di-$CH_3$ | " | " | " |
| " | 2,5-di-$OCH_3$ | " | " | " |
| " | 3-$OCH_3$ | —$C_2H_5$ | " | " |
| " | 2-$OCH_3$, 5-NHCOCH$_3$ | H | " | " |
| 3-$SCH_3$ | 2-$CH_3$, 3-Cl | " | " | " |
| 3-$C_6H_5$ | 2-$OCH_3$, 5-Cl | " | " | " |
| 3-$C_6H_4$—p-Cl | 3-$NHCOCH_3$ | —$C_2H_5$ | " | " |
| 3-$C_6H_4$—o-CN | 3-$NHCOC_2H_5$ | —$C_2H_4OCH_3$ | " | " |
| " | 3-$NHCOCH_2OH$ | —$CH_2C_6H_5$ | " | " |
| " | 3-$NHCOCH_2OCH_3$ | —$C_6H_{11}$ | " | " |
| " | 3-$NHCOC_6H_5$ | —$CH_2C_6H_{11}$ | " | " |
| " | 3-$NHCOOC_2H_5$ | —$CH_2CH_2OC_6H_5$ | " | " |
| " | 3-$NHCONHC_2H_5$ | —$CH_2CH_2OH$ | " | " |
| " | 3-$NHCOC_6H_{11}$ | —$CH_2CH(CH_3)_2$ | " | " |
| 3-$C_6H_5$ | 3-$NHCOCH_2CN$ | —$CH_2CH_2CH_2CH_3$ | " | " |
| " | 3-$NHCOCH_2OC_6H_5$ | —$CH_2CH_2OCOCH_3$ | " | " |
| " | 3-$NHCOCH_2C_6H_5$ | —$CH_2CH_2CONH_2$ | " | " |
| " | 3-$CH_3$ | —$CH_2CH_2NHCOCH_3$ | " | " |
| " | " | —$CH_2CH_2NHSO_2CH_3$ | " | " |
| 3-$C_6H_4$—p-$CH_2$ | " | —$CH_2CH_2SO_2NH_2$ | " | " |
| 3-$C_6H_5$ | " | —$CH_2CH_2CH_2SO_2CH_3$ | " | " |
| " | " | —$CH_2CH_2SCH_3$ | " | " |
| " | " | —$CH_2CH_2N$(COCH$_2$)(COCH$_2$) | —$CH_2CH_2CH_2$— | $Na^+$ |
| " | " | —$CH_2CH_2CH_2N$(CO—$CH_2$)($CH_2$ $CH_2$)(CH$_2$) | " | " |
| " | 3-$OC_6H_5$ | —$CH_2CH_2N$(CO)(CO)-phenyl | " | $NH_4^+$ |
| " | 3-$CH_3$ | —$C_6H_5$ | —$CH_2CH_2$— | $Na^+$ |
| " | " | —$CH_2$-furan | —$CH_2CH(CH_2OC_6H_5)$— | " |
| 3-$SO_2CH_3$ | " | —$CH_2CH_2COOCH_3$ | —$CH_2CH(C_6H_5)$— | " |
| 3-$SCH_2CH_2COOCH_3$ | " | —$CH_2CH_2CN$ | —$CH_2CH(CH_3)$— | " |
| 3-$SCH_2C_6H_5$ | " | —$C_2H_5$ | —$CH_2CH(OH)CH_2$— | " |
| 3-$SCH_2CH_2OCH_3$ | 2-$CH_3S$ | H | —$CH_2CH_2CH_2CH_2$— | " |
| 3-$SC_6H_{11}$ | 3-$CH_3$ | —$C_2H_4OC_2H_4OC_2H_5$ | —$CH_2CH(OCOCH_3)CH_2$— | " |
| 3-$SC_2H_5$ | " | —$CH_2CH(OH)CH_2Cl$ | —$CH_2CH_2$— | " |
| " | 2-$OCH_3$, 5-$CH_3$ | $C_2H_5$ | " | " |
| " | " | H | —$CH_2CH_2OCH_2CH_2$— | " |
| " | " | " | —$CH_2CH_2SO_2CH_2CH_2$— | $K^+$ |
| 3-$SCH_2COOCH_3$ | 3-$CH_3$ | $C_2H_5$ | —$CH_2CH_2SCH_2CH_2$— | " |
| " | " | " | —$CH_2CH_2N(SO_2CH_3)CH_2CH_2$— | " |
| " | " | " | —$CH_2CH_2NHSO_2CH_2CH_2CH_2CH_2$— | " |
| " | " | " | —$CH_2CH_2SO_2NHCH_2CH_2$— | " |
| 3-$SCH_3$ | " | " | —$CH_2CH_2N(COCH_3)CH_2CH_2$— | " |
| " | " | " | —$CH_2CH_2CONHC_2H_4$— | " |
| " | " | " | —$CH_2CH_2NHCOCH_2$— | " |
| " | " | " | —$CH_2CH_2N(SO_2C_6H_5)CH_2CH_2$— | " |
| 3-$SCH_2CH(CH_3)_2$ | " | " | —$CH_2CH_2SO_2N(CH_3)CH_2CH_2$— | " |
| " | " | " | —$CH_2CH_2SO_2N(C_6H_5)CH_2CH_2$— | " |
| " | " | " | —$CH_2CH_2N(SO_2C_6H_{11})CH_2CH_2$— | " |
| " | " | " | —$CH_2CH_2N(COCH_3)CH_2CH_2$— | " |
| " | " | " | —$CH_2CH(CH_2OCH_3)$— | " |
| " | " | " | —$CH_2CH(Cl)CH_2$— | " |
| " | " | " | —$CH_2CH_2NHCONHC_2H_4$— | " |
| " | " | " | —$CH_2CH_2NHCOOCH_2CH_2$— | " |
| " | " | " | —$CH_2CH_2COOCH_2CH_2$— | " |

TABLE 5

| R | (R₁)$_m$ | R₃ | R₄ | Z | M |
|---|---|---|---|---|---|
| 3-CH₃ | H | CH₃ | CH₃ | —CH₂CH₂— | K⁺ |
| " | 7-CH₃ | " | " | " | " |
| " | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| " | 8-OC₂H₅ | H | H | " | " |
| 3-SCH₃ | 7-CH₃ | " | " | " | " |
| 3-C₆H₅ | 7-NHCOCH₃ | CH₃ | CH₃ | " | Na⁺ |
| " | 7-NHCOH | " | " | " | " |
| " | 7-NHCOCH₂OCH₃ | " | " | " | " |
| " | 7-NHCOCH₂OC₆H₅ | H | CH(CH₃)₂ | " | " |
| " | 7-NHCOCH₂C₆H₅ | " | " | " | " |
| " | 7-NHCOCH₂Cl | " | " | " | " |
| " | 7-NHCOC₆H₅ | " | " | " | " |
| " | 7-NHCOC₆H₁₁ | CH₃ | CH₃ | " | " |
| " | 7-NHCONHC₂H₅ | " | " | " | " |
| " | 7-NHSO₂CH₃ | " | " | " | " |
| " | 7-NHCOCH₂CN | " | " | " | " |
| C₆H₄—o-CN | 7-NHCOCH₂OH | " | " | " | " |
| " | 7-NHCOOC₂H₅ | " | " | —CH₂CH₂CH₂— | " |
| " | 7-NHCOCH₂CH₂OCCH₃ (O) | " | " | " | " |
| " | 8-OC₄H₉—n | H | CH₃ | —CH₂CH₂— | " |
| 3-C₆H₄—p-CH₃ | 7-CH₃ | CH₃ | H | " | " |
| 3-C₆H₄—o-Cl | 7-NHCO—(oxete) | " | CH₃ | " | " |
| 3-SO₂CH₃ | 7-OC₂H₅ | " | " | " | " |
| 3-SC₆H₁₁ | 7-OC₄H₉—n | " | " | " | " |
| 3-SCH₂CH₂OCH₃ | 7-CH₃ | " | H | " | " |
| 3-SCH₂CH₂COOCH₃ | " | " | " | " | " |
| 3-SCH₂C₆H₅ | " | " | " | —CH₂CH₂CH₂CH₂— | " |
| 3-CH₂CH₃ | " | " | " | —CH₂CH₂— | " |
| 3-SCH₂COOCH₃ | " | " | " | " | " |
| 3-SCH₂CH₂COOC₂H₅ | " | " | " | " | " |
| 3-SCH₂CH₂COOCH(CH₃)₂ | " | " | " | —CH₂CH₂SO₂CH₂CH₂— | K⁺ |
| 3-SO₂C₄H₉—n | " | " | " | —CH₂CH₂OCH₂CH₂— | " |
| 3-SCH₂CH₂CONHC₄H₉—n | " | " | " | —CH₂CH₂SCH₂— | " |
| 3-SCH₃ | " | " | " | —CH₂CH(C₆H₅)— | " |
| " | " | " | " | —CH₂CH(CH₃)— | " |
| 3-SC₂H₅ | " | " | " | —CH₂CH(OH)CH₂— | " |
| " | " | " | " | —CH₂CH(Cl)CH₂— | " |
| " | " | " | " | —CH₂CH(CH₂OCH₂CH₃)— | " |
| " | " | " | " | —CH₂CH(CH₂OC₆H₅)— | " |
| " | " | " | " | —CH₂CH₂N(SO₂CH₃)CH₂CH₂— | " |
| " | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| " | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| " | " | " | " | —CH₂CH₂SO₂N(C₆H₅)CH₂CH₂— | " |
| " | " | " | " | —CH₂CH₂SO₂N(CH₃)CH₂CH₂— | " |

TABLE 6

[Structure: R-substituted thiazole connected via N=N azo linkage to benzene ring numbered 5,6,7,8 with (R₁)ₘ substituent, and N(Z-OSO₃M)(R₃) group with positions 1,2,3,4]

| R | (R₁)ₘ | R₃ | Z | M |
|---|---|---|---|---|
| 3-CH₃ | 6-CH₃ | H | —CH₂CH₂— | K⁺ |
| " | H | H | " | " |
| " | " | CH₃ | " | " |
| " | 6-CH₃ | " | " | " |
| " | " | " | —CH₂CH₂CH₂CH₂— | " |
| " | 6-OCH₃ | " | " | " |
| 3-SCH₃ | " | " | —CH₂CH₂— | " |
| 3-CH₂CH₃ | 6-CH₃ | " | —CH₂CH₂OCH₂CH₂— | " |
| 3-SCH₂CH₂OCH₃ | " | " | —CH₂CH₂SO₂CH₂CH₂— | " |
| 3-SCH₂CH₂OC₂H₅ | " | " | —CH₂CH₂SCH₂CH₂— | " |
| 3-SCH₂CH₂COOCH₃ | " | " | —CH₂CH(CH₃) | " |
| 3-SCH₂COOCH₂CH₃ | " | " | —CH₂CH(C₆H₅)— | " |
| 3-SCH₂C₆H₅ | 6-OC₂H₅ | " | —CH₂CH₂— | " |
| 3-SC₆H₁₁ | 6-NHCOCH₃ | " | " | Na⁺ |
| 3-SCH₃ | 6-NHCOH | " | " | " |
| " | 6-NHCOCH₂CH₂OCH₃ | " | " | " |
| " | 6-NHCOCH₂Cl | " | " | " |
| " | 6-NHCOCH₂CN | " | " | " |
| " | 6-NHCOCH₂CONH₂ | " | " | " |
| " | 6-NHCOCH₂OC₆H₅ | " | " | " |
| 3-SO₂CH₃ | 6-NHCOOC₂H₅ | " | " | " |
| 3-SO₂C₄H₉—n | 6-NHCONHC₂H₅ | " | " | " |
| 3-C₆H₅ | 6-NHCOC₆H₁₁ | " | " | " |
| 3-C₆H₄—o-CN | 6-NHCOC₆H₅ | " | " | " |
| 3-C₆H₄—o-Cl | 6-NHSO₂CH₃ | " | " | " |
| 3-C₆H₄—p-CH₃ | 6-NHCOCH₂CH₂OCOCH₃ | " | " | " |
| 3-C₆H₄—m-CH₃ | 6-NHCO-(furan) | " | " | " |
| 3-C₆H₄—o-CH₃ | 6-NHCOCH₂CH₂CH₂OH | " | " | " |
| 3-C₆H₄—o-CONH₂ | 6-CH₃ | " | —CH₂CH₂CH₂— | " |
| 3-C₆H₄—o-CN | " | " | —CH₂CH₂— | " |
| 3-S—CH₂CH₂OC₆H₅ | " | " | " | " |
| 3-SO₂C₄H₉—n | " | " | " | " |
| 3-SO₂CH₂CH₂COOCH₃ | " | " | " | " |
| 3-SO₂CH₂COOCH₃ | " | " | " | " |
| 3-SO₂C₆H₁₁ | " | " | " | " |
| 3-SO₂CH₂CH₃ | " | " | " | " |
| 3-SO₂CH₂CH₂OCH₃ | " | H | —CH₂CH(CH₃)— | " |
| 3-SCH₂CH₂CONHC₂H₄OH | " | CH₃ | —CH₂CH₂N(SO₂CH₃)CH₂CH₂— | K⁺ |
| 3-SCH₂CH₃ | " | " | —CH₂CH₂SO₂NHCH₂CH₂— | " |
| " | " | " | —CH₂CH₂SO₂N(CH₃)CH₂CH₂CH₂— | " |
| " | " | " | —CH₂CH₂SO₂N(C₆H₅)CH₂CH₂— | " |
| " | " | " | —CH₂CH₂SO₂N(C₆H₁₁)CH₂CH₂— | " |
| " | " | " | —CH₂CH₂CH₂CH₂N(SO₂CH₃)CH₂CH₂— | " |
| " | " | " | —CH₂CH₂N(SO₂C₆H₄—p-CH₃)—CH₂CH₂— | " |
| " | " | " | —CH₂CH₂N(SO₂C₆H₁₁)CH₂CH₂— | " |
| 3-C₆H₅ | " | " | —CH₂CH(Cl)CH₂— | " |
| " | " | " | —CH₂CH(OH)CH₂— | " |
| " | " | " | —CH₂CH(CH₂OCH₃) | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂CH₂— | " |
| " | " | " | —CH₂CH₂N(COCH₃)CH₂CH₂— | " |
| " | " | " | —CH₂CH₂N(COC₆H₅)CH₂CH₂— | " |

TABLE 7

[Structure: isothiazole ring (with substituent R) connected via N=N azo linkage to a phenyl ring bearing (R₁)ₘ substituents and an N(R₂)(Z—OSO₃M) group]

| R | (R₁)ₘ | R₂ | Z | M |
|---|---|---|---|---|
| 3-CH₃, 4-Br | 2-CH₃ | H | —CH₂CH₂— | K⁺ |
| " | 2-Cl | " | " | " |
| " | 2,5-di-Cl | " | " | " |
| " | 2,5-di-CH₃ | " | " | " |
| " | 2,5-di-OCH₃ | " | " | " |
| " | 3-OCH₃ | —C₂H₅ | " | " |
| " | 2-OCH₃, 5-NHCOCH₃ | H | " | " |
| " | 2-CH₃, 3-Cl | " | " | " |
| " | 2-OCH₃, 5-Cl | " | " | " |
| " | 3-NHCOCH₃ | —C₂H₅ | " | " |
| " | 3-NHCOC₂H₅ | —C₂H₄OCH₃ | " | " |
| " | 3-NHCOCH₂OH | —CH₂C₆H₅ | " | " |
| " | 3-NHCOCH₂OCH₃ | —C₆H₁₁ | " | " |
| " | 3-NHCOC₆H₅ | —CH₂C₆H₁₁ | " | " |
| " | 3-NHCOOC₂H₅ | —CH₂CH₂OC₆H₅ | " | " |
| 3-CH₃—4-Cl | 3-NHCONHC₂H₅ | —CH₂CH₂OH | " | " |
| " | 3-NHCOC₆H₁₁ | —CH₂CH(CH₃)₂ | " | " |
| " | 3-NHCOCH₂CN | —CH₂CH₂CH₂CH₃ | " | " |
| " | 3-NHCOCH₂OC₆H₅ | —CH₂CH₂OCOCH₃ | " | " |
| 3-CH₃—4-CN | 3-NHCOCH₂C₆H₅ | —CH₂CH₂CONH₂ | " | " |
| 3-CH₃—4-COOC₂H₅ | 3-CH₃ | —CH₂CH₂NHCOCH₃ | " | " |
| " | " | —CH₂CH₂NHSO₂CH₃ | " | " |
| " | " | —CH₂CH₂SO₂NH₂ | " | " |
| " | " | —CH₂CH₂CH₂SO₂CH₃ | " | " |
| 3-CH₃—4-SCH₂CH=CH₂ | " | —CH₂CH₂SCH₃ | " | " |
| " | " | —CH₂CH₂N(COCH₂)₂ (succinimide) | —CH₂CH₂CH₂— | Na⁺ |
| " | " | —CH₂CH₂CH₂N(CO—CH₂—CH₂—CH₂) (glutarimide) | " | " |
| 3-CH₃—4-SO₂C₂H₅ | 3-OC₆H₅ | —CH₂CH₂N(phthalimido) | " | NH₄⁺ |
| 3-CH₃—4-SC₆H₁₁ | 3-CH₃ | —C₆H₅ | —CH₂CH₂— | Na⁺ |
| 3-CH₃—4-OC₂H₅ | " | " | —CH₂CH(CH₂OC₆H₅)— | " |
| | | —CH₂-(oxazole) | | |
| 3-Cl—4-CN | " | —CH₂CH₂COOCH₃ | —CH₂CH(C₆H₅)— | " |
| 3-CH₃—4-SCN | " | —CH₂CH₂CN | —CH₂CH(CH₃)— | " |
| 3-Br—4-COOCH₃ | " | —C₂H₅ | —CH₂CH(OH)CH₂— | " |
| 3-CH₃—4-COOC₂H₅ | 2-CH₃S | H | —CH₂CH₂CH₂CH₂— | " |
| 3-CH₃—4-CONH₂ | 3-CH₃ | —C₂H₄OC₂H₄OC₂H₅ | —CH₂CH(OCOCH₃)CH₂— | " |
| 3-CH₃—4-CONHC₂H₄OH | " | —CH₂CH(OH)CH₂Cl | —CH₂CH₂— | " |
| 3-CH₃—4-CONHC₄H₉—n | 2-OCH₃, 5-CH₃ | C₂H₅ | " | " |
| 3-CH₃—4-OC₆H₅ | " | H | —CH₂CH₂OCH₂CH₂— | " |
| 3-CH₃—4-OC₆H₄—p-CH₃ | " | H | " | " |
| 3-CH₃—4-SC₆H₅ | " | " | —CH₂CH₂SO₂CH₂CH₂— | K⁺ |
| 3-CH₃—4-SCH₂CH₂OH | 3-CH₃ | C₂H₅ | —CH₂CH₂SCH₂CH₂— | " |
| 3-CH₃—4-SCH₂CH₃ | " | " | —CH₂CH₂N(SO₂CH₃)CH₂CH₂— | " |
| " | " | " | —CH₂CH₂NHSO₂CH₂CH₂CH₂CH₂— | " |
| 3-CH₃—4-S—C(=N-benzothiazolyl)S | | | | |
| 3-CH₃—4-Br | " | " | —CH₂CH₂SO₂NHCH₂CH₂— | " |
| " | " | " | —CH₂CH₂N(COCH₃)CH₂CH₂— | " |
| " | " | " | —CH₂CH₂CONHC₂H₄— | " |
| " | " | " | —CH₂CH₂NHCOCH₂— | " |
| " | " | " | —CH₂CH₂N(SO₂C₆H₅)CH₂CH₂— | " |
| 3-CH₃—4-CONH₂ | " | " | —CH₂CH₂SO₂N(CH₃)CH₂CH₂— | " |
| 3-CH₃—4-CONHC₃H₆OCH₃ | " | " | —CH₂CH₂SO₂N(C₆H₅)CH₂CH₂— | " |
| 3-CH₃—4-Cl | " | " | —CH₂CH₂N(SO₂C₆H₁₁)CH₂CH₂— | " |
| " | " | " | —CH₂CH₂N(COCH₃)CH₂CH₂— | " |
| " | " | " | —CH₂CH(CH₂OCH₃)— | " |
| " | " | " | —CH₂CH(Cl)CH₂— | " |
| " | " | " | —CH₂CH₂NHCONHC₂H₄— | " |

TABLE 7-continued

| R | (R₁)ₘ | R₂ | Z | M |
|---|---|---|---|---|
| " | " | " | —CH₂CH₂NHCOOCH₂CH₂— | " |
| " | " | " | —CH₂CH₂COOCH₂CH₂— | " |

TABLE 8

| R | (R₁)ₘ | R₃ | R₄ | Z | M |
|---|---|---|---|---|---|
| 3-CH₃—4-Br | H | CH₃ | CH₃ | —CH₂CH₂— | K⁺ |
| " | 7-CH₃ | " | " | " | " |
| " | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| " | 8-OC₂H₅ | H | H | " | " |
| " | 7-CH₃ | " | " | " | " |
| 3-CH₃—4-CN | 7-NHCOCH₃ | CH₃ | CH₃ | " | Na⁺ |
| " | 7-NHCOH | " | " | " | " |
| " | 7-NHCOCH₂OCH₃ | " | " | " | " |
| 3-CH₃—4-COOC₂H₅ | 7-NHCOCH₂OC₆H₅ | H | CH(CH₃)₂ | " | " |
| " | 7-NHCOCH₂C₆H₅ | " | " | " | " |
| " | 7-NHCOCH₂Cl | " | " | " | " |
| 3-CH₃ | 7-NHCOC₆H₅ | " | " | " | " |
| " | 7-NHCOC₆H₁₁ | CH₃ | CH₃ | " | " |
| 3-CH₃—4-Cl | 7-NHCONHC₂H₅ | " | " | " | " |
| " | 7-NHSO₂CH₃ | " | " | " | " |
| " | 7-NHCOCH₂CN | " | " | " | " |
| " | 7-NHCOCH₂OH | " | " | " | " |
| 3-Cl—4-CN | 7-NHCOOC₂H₅ | " | " | —CH₂CH₂CH₂— | " |
| 3-Br—4-COOCH₃ | 7-NHCOCH₂CH₂OCOCH₃ | " | " | " | " |
| 3-CH₃—4-COOCH₃ | 8-OC₄H₉—n | H | " | —CH₂CH₂— | " |
| 3-CH₃—4-CONH₂ | 7-CH₃ | CH₃ | H | " | " |
| 3-CH₃—4-CONHC₂H₄OH | 7-NHCO—(oxazole) | " | CH₃ | " | " |
| 3-CH₃—4-CONHC₄H₉—n | 7-OC₂H₅ | " | " | " | " |
| 3-CH₃—4-CONHC₃H₆OCH₃ | 7-OC₄H₉—n | " | " | " | " |
| 3-CH₃—4-COOC₂H₄OCH₃ | 7-CH₃ | " | H | " | " |
| 3-CH₃—4-SCH₂CH₂OH | " | " | " | " | " |
| 3-CH₃—4-SCH₂CH₂OCOCH₃ | " | " | " | —CH₂CH₂CH₂CH₂— | " |
| 3-CH₃—4-SCH₃ | " | " | " | —CH₂CH₂— | " |
| 3-CH₃—4-SO₂CH₃ | " | " | " | " | " |
| 3-CH₃—4-SC₆H₅ | " | " | " | " | " |
| 3-CH₃—4-SC₆H₄—p-C(CH₃)₃ | " | " | " | —CH₂CH₂SO₂CH₂CH₂— | K⁺ |
| 3-CH₂—4-SC₆H₄—p-Cl | " | " | " | —CH₂CH₂OCH₂CH₂— | " |
| 3-CH₃—4-S—(benzothiazolyl) | " | " | " | —CH₂CH₂SCH₂CH₂— | " |
| " | " | " | " | —CH₂CH(C₆H₅)— | " |
| 3-CH₃—4-S—(benzoxazolyl) | " | " | " | " | " |

TABLE 8-continued

Structure: isothiazole ring (R substituent) —N=N— benzene ring (R₁)ₘ with CH₂ linkage to C(R₃)(R₄)—N(ZOSO₃M)

| R | (R₁)ₘ | R₃ | R₄ | Z | M |
|---|---|---|---|---|---|
| 3-CH₃—4-S—C(=N)—NH—CH=N (triazole) | " | " | " | —CH₂CH(CH₃)— | " |
| 3-CH₃—4-SC₆H₁₁ | " | " | " | —CH₂CH(OH)CH₂— | " |
| 3-CH₃—4-SCN | " | " | " | —CH₂CH(Cl)CH₂— | " |
| 3-CH₃—4-OC₆H₅ | " | " | " | —CH₂CH(CH₂OCH₂CH₃)— | " |
| 3-CH₃—4-OC₂H₅ | " | " | " | —CH₂CH(CH₂OC₆H₅)— | " |
| 3-CH₃—4-SCH₂CH=CH₂ | " | " | " | —CH₂CH₂N(SO₂CH₃)CH₂CH₂— | " |
| 3-CH₃—4-Br | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| " | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| " | " | " | " | —CH₂CH₂SO₂N(C₆H₅)CH₂CH₂— | " |
| " | " | " | " | —CH₂CH₂SO₂N(CH₃)CH₂CH₂— | " |

TABLE 9

Structure: isothiazole ring (R) —N=N— benzene (R₁)ₘ with O-CH₂-CH(R₃)-N(Z-OSO₃M)

| R | (R₁)ₘ | R₃ | Z | M |
|---|---|---|---|---|
| 3-CH₃—4-Cl | 6-CH₃ | H | —CH₂CH₂— | K⁺ |
| " | H | H | " | " |
| " | " | CH₃ | " | " |
| " | 6-CH₃ | " | " | " |
| 3-Cl—4-CN | " | " | —CH₂CH₂CH₂CH₂— | " |
| " | 6-OCH₃ | " | " | " |
| 3-CH₃ | " | " | —CH₂CH₂— | " |
| 3-CH₃—4-COOC₂H₅ | 6-CH₃ | " | —CH₂CH₂OCH₂CH₂— | " |
| 3-CH₃—4-CONH₂ | " | " | —CH₂CH₂SO₂CH₂CH₂— | " |
| 3-CH₃—4-CONHC₂H₄OH | " | " | —CH₂CH₂SCH₂CH₂— | " |
| 3-CH₃—4-CONHC₄H₉—n | " | " | —CH₂CH(CH₃) | " |
| 3-CH₃—4-CONHC₃H₆OCH₃ | " | " | —CH₂CH(C₆H₅)— | " |
| 3-CH₃—4-CO₂CH₂H₂OCH₃ | 6-OC₂H₅ | " | —CH₂CH₂— | " |
| 3-CH₃—4-CONHCH₃ | 6-NHCOCH₃ | " | " | Na⁺ |
| 3-CH₃—4-Br | 6-NHCOH | " | " | " |
| " | 6-NHCOCH₂CH₂OCH₃ | " | " | " |
| " | 6-NHCOCH₂Cl | " | " | " |
| " | 6-NHCOCH₂CN | " | " | " |
| " | 6-NHCOCH₂CONH₂ | " | " | " |
| " | 6-NHCOCH₂OC₆H₅ | " | " | " |
| 3-CH₃—4-SC₂H₅ | 6-NHCOOC₂H₅ | " | " | " |
| 3-CH₃—4-SCH₂CH₂OH | 6-NHCONHC₂H₅ | " | " | " |
| 3-CH₃—4-SCH₂CH=CH₂ | 6-NHCOC₆H₅ | " | " | " |
| 3-CH₃—4-SCH₂CH₂OCOCH₃ | 6-NHCOC₆H₁₁ | " | " | " |
| 3-CH₃—4-S—C₆H₅ | 6-NHSO₂CH₃ | " | " | " |
| 3-CH₃—4-S—C₆H₄—p-C(CH₃)₂ | 6-NHCOCH₂CH₂OCOCH₃ | " | " | " |
| 3-CH₃—4-S—C₆H₁₁ | 6-NHCO—(furan) | " | " | " |
| 3-CH₃—4-SO₂CH₂CH₂OH | 6-NHCOCH₂CH₂CH₂OH | " | " | " |
| 3-CH₃—4-SO₂CH₂CH₃ | 6-CH₃ | " | —CH₂CH₂CH₂— | " |
| 3-CH₃—4-OC₆H₅ | " | " | —CH₂CH₂— | " |
| 3-CH₃—4-OC₆H₄—p-OCH₃ | " | " | " | " |

TABLE 9-continued

Structure: [R-substituted isothiazole]-N=N-[phenyl(R₁)m with O-CH₂-CH(R₃)- and N(Z-OSO₃M)]

| R | (R₁)ₘ | R₃ | Z | M |
|---|---|---|---|---|
| 3-CH₃—4-S—C(benzothiazole fused) | " | " | " | " |
| 3-CH₃—4-S—C(thiadiazole-NHCOCH₃) | " | " | " | " |
| 3-CH₃—4-S—C(triazole-NH,=CH) | " | " | " | " |
| 3-CH₃—4-SCH₂CH(OH)CH₂OH | " | " | " | " |
| 3-CH₃—4-SCH₂COOCH₃ | " | " | " | " |
| 3-CH₃—4-OC₂H₅ | " | H | —CH₂CH(CH₃)— | " |
| 3-CH₃—4-Br | " | CH₃ | —CH₂CH₂N(SO₂CH₃)CH₂CH₂— | K⁺ |
| " | " | " | —CH₂CH₂SO₂NHCH₂CH₂— | " |
| " | " | " | —CH₂CH₂SO₂N(CH₃)CH₂CH₂CH₂— | " |
| " | " | " | —CH₂CH₂SO₂N(C₆H₅)CH₂CH₂— | " |
| " | " | " | —CH₂CH₂SO₂N(C₆H₁₁)CH₂CH₂— | " |
| " | " | " | —CH₂CH₂CH₂CH₂N(SO₂CH₃)CH₂CH₂— | " |
| " | " | " | —CH₂CH₂N(SO₂C₆H₄—p-CH₃)—CH₂CH₂— | " |
| " | " | " | —CH₂CH₂N(SO₂C₆H₁₁)CH₂CH₂— | " |
| " | " | " | —CH₂CH(Cl)CH₂— | " |
| " | " | " | —CH₂CH(OH)CH₂— | " |
| " | " | " | —CH₂CH(CH₂OCH₃)— | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂CH₂— | " |
| " | " | " | —CH₂CH₂N(COCH₃)CH₂CH₂— | " |
| " | " | " | —CH₂CH₂N(COC₆H₅)CH₂CH₂— | " |

TABLE 10

Structure: [R-substituted pyrazole with N-A]-N=N-[phenyl(R₁)m with N(R₂)(Z-OSO₃M)]

| A | R | (R₁)ₘ | R₂ | Z | M |
|---|---|---|---|---|---|
| H | 4-CN | 2-CH₃ | H | —CH₂CH₂— | K⁺ |
| " | " | 2-Cl | " | " | " |
| " | " | 2,5-di-Cl | " | " | " |
| " | " | 2,5-di-CH₃ | " | " | " |
| " | " | 2,5-di-OCH₃ | " | " | " |
| " | " | 3-OCH₃ | —C₂H₅ | " | " |
| " | " | 2-OCH₃, 5-NHCOCH₃ | H | " | " |
| " | " | 2-CH₃, 3-Cl | " | " | " |
| " | " | 2-OCH₃, 5-Cl | " | " | " |
| " | " | 3-NHCOCH₃ | —C₂H₅ | " | " |
| " | " | 3-NHCOC₂H₅ | —C₂H₄OCH₃ | " | " |
| " | " | 3-NHCOCH₂OH | —CH₂C₆H₅ | " | " |
| " | " | 3-NHCOCH₂OCH₃ | —C₆H₁₁ | " | " |
| " | " | 3-NHCOC₆H₅ | —CH₂C₆H₁₁ | " | " |
| " | " | 3-NHCOOC₂H₅ | —CH₂CH₂OC₆H₅ | " | " |
| " | " | 3-NHCONHC₂H₅ | —CH₂CH₂OH | " | " |
| " | " | 3-NHCOC₆H₁₁ | —CH₂CH(CH₃)₂ | " | " |
| C₆H₅ | 3-SC₂H₅—4-CN | 3-NHCOCH₂CN | —CH₂CH₂CH₂CH₃ | " | " |
| " | 3-SC₂H₅—4-COOCH₃ | 3-NHCOCH₂OC₆H₅ | —CH₂CH₂OCOCH₃ | " | " |
| " | 3-SC₂H₅—4-CONH₂ | 3-NHCOCH₂C₆H₅ | —CH₂CH₂CONH₂ | " | " |
| " | 3-SCH₃—4-CN | | | | |

TABLE 10-continued

Structure: pyrazole-N=N-phenyl(R1)m-N(R2)(Z-OSO3M), with R at pyrazole, A on pyrazole N

| A | R | (R₁)ₘ | R₂ | Z | M |
|---|---|---|---|---|---|
| " | " | 3-CH₃ | —CH₂CH₂NHCOCH₃ | " | " |
| " | " | " | —CH₂CH₂NHSO₂CH₃ | " | " |
| " | " | " | —CH₂CH₂SO₂NH₂ | " | " |
| SO₂C₆H₅ | " | " | —CH₂CH₂CH₂SO₂CH₃ | " | " |
| COCH₃ | 4-CN | " | —CH₂CH₂SCH₃ | " | " |
| H | " | " | —CH₂CH₂N(COCH₂)₂ (morpholine-dione ring) | —CH₂CH₂CH₂— | Na⁺ |
| " | " | " | —CH₂CH₂CH₂N(CO—CH₂)(CH₂CH₂) (ring) | " | " |
| " | " | 3-OC₆H₅ | —CH₂CH₂N(CO)₂C₆H₄ (phthalimide) | " | NH₄⁺ |
| COOC₂H₅ | " | 3-CH₃ | —C₆H₅ | —CH₂CH₂— | Na⁺ |
| H | " | " | —CH₂-furyl | —CH₂CH(CH₂OC₆H₅)— | " |
| CH₃ | 4-CN | " | —CH₂CH₂COOCH₃ | —CH₂CH(C₆H₅)— | " |
| " | 4-COOCH₃ | " | —CH₂CH₂CN | —CH₂CH(CH₃)— | " |
| " | 4-CONH₂ | " | —C₂H₅ | —CH₂CH(OH)CH₂— | " |
| —CH₂CH₃ | 4-CN | 2-CH₃S | H | —CH₂CH₂CH₂CH₂— | " |
| C₆H₅ | " | 3-CH₃ | —C₂H₄OC₂H₄OC₂H₅ | —CH₂CH(OCOCH₃)CH₂— | " |
| " | 4-COOCH₃ | " | —CH₂CH(OH)CH₂Cl | —CH₂CH₂— | " |
| C₆H₄—p-Cl | " | 2-OCH₃, 5-CH₃ | C₂H₅ | " | " |
| C₆H₄—o-CH₃ | " | " | H | —CH₂CH₂OCH₂CH₂— | " |
| C₆H₅ | " | " | H | —CH₂CH₂SO₂CH₂CH₂— | K⁺ |
| H | 4-CONHC₂H₄OH | 3-CH₃ | C₂H₅ | —CH₂CH₂SCH₂CH₂— | " |
| " | 4-CONHC₄H₉—n | " | " | —CH₂CH₂N(SO₂CH₃)CH₂CH₂— | " |
| " | 4-COOC₂H₄OCH₃ | " | " | —CH₂CH₂NHSO₂CH₂CH₂CH₂CH₂— | " |
| " | 4-CONHC₃H₆OCH₃ | " | " | —CH₂CH₂SO₂NHCH₂CH₂— | " |
| " | 4-CN | " | " | —CH₂CH₂N(COCH₃)CH₂CH₂— | " |
| " | " | " | " | —CH₂CH₂CONHC₂H₄— | " |
| " | " | " | " | —CH₂CH₂NHCOC₂H₄— | " |
| SO₂CH₃ | 4-CN | " | " | —CH₂CH₂N(SO₂C₆H₅)CH₂CH₂— | " |
| SO₂C₆H₅ | " | " | " | —CH₂CH₂SO₂N(CH₃)CH₂CH₂— | " |
| SO₂CH₂CH₃ | " | " | " | —CH₂CH₂SO₂N(C₆H₅)CH₂CH₂— | " |
| H | " | " | " | —CH₂CH₂N(SO₂C₆H₁₁)CH₂CH₂— | " |
| " | " | " | " | —CH₂CH₂N(COCH₃)CH₂CH₂— | " |
| " | " | " | " | —CH₂CH(CH₂OCH₃)— | " |
| " | " | " | " | —CH₂CH(Cl)CH₂— | " |
| " | " | " | " | —CH₂CH₂NHCONHC₂H₄— | " |
| " | " | " | " | —CH₂CH₂NHCOOCH₂CH₂— | " |
| " | " | " | " | —CH₂CH₂COOCH₂CH₂— | " |

TABLE 11

Structure: pyrazole-N=N-tetrahydroquinoline type with R₃, R₄ substituents

| A | R | (R₁)ₘ | R₃ | R₄ | Z | M |
|---|---|---|---|---|---|---|
| H | 4-CN | H | CH₃ | CH₃ | —CH₂CH₂— | K⁺ |
| " | " | 7-CH₃ | " | " | " | " |
| " | " | 7-OCH₃ | " | " | " | " |
| " | " | 7-Cl | " | " | " | " |
| " | " | 5-CH₃, 8-OCH₃ | " | " | " | " |
| " | " | 5,8-di-OCH₃ | " | " | " | " |
| " | " | 5,8-di-CH₃ | " | " | " | " |
| " | " | 5-Cl, 8-OCH₃ | " | " | " | " |

TABLE 11-continued

| A | R | (R₁)$_m$ | R₃ | R₄ | Z | M |
|---|---|---|---|---|---|---|
| " | " | 8-OCH₃ | " | " | " | " |
| " | " | 8-OC₂H₅ | H | H | " | " |
| " | " | 7-CH₃ | " | " | " | " |
| CH₃ | " | 7-NHCOCH₃ | CH₃ | CH₃ | " | Na⁺ |
| " | " | 7-NHCOH | " | " | " | " |
| H | 4-COOCH₃ | 7-NHCOCH₂OCH₃ | " | " | " | " |
| " | 4-COOC₂H₅ | 7-NHCOCH₂OC₆H₅ | H | CH(CH₃)₂ | " | " |
| " | 4-COOC₂H₄OCH₃ | 7-NHCOCH₂C₆H₅ | " | " | " | " |
| " | 4-CONH₂ | 7-NHCOCH₂Cl | " | " | " | " |
| " | 4-CONHC₂H₅ | 7-NHCOC₆H₅ | " | " | " | " |
| " | " | 7-NHCOC₆H₁₁ | CH₃ | CH₃ | " | " |
| " | " | 7-NHCONHC₂H₅ | " | " | " | " |
| C₆H₅ | 4-CN | 7-NHSO₂CH₃ | " | " | " | " |
| " | " | 7-NHCOCH₂CN | " | " | " | " |
| C₆H₄—p-Cl | " | 7-NHCOCH₂OH | " | " | " | " |
| C₆H₄—p-CH₃ | " | 7-NHCOOC₂H₅ | " | " | —CH₂CH₂CH₂— | " |
| SO₂CH₃ | " | 7-NHCOCH₂CH₂OCOCH₃ | " | " | " | " |
| " | 4-COOCH₃ | 8-OC₄H₉—n | H | " | —CH₂CH₂— | " |
| SO₂C₆H₅ | " | 7-CH₃ | CH₃ | H | " | " |
| " | 4-CN | 7-NHCO—(furan) | " | CH₃ | " | " |
| " | 4-CONHC₂H₄OH | 7-OC₂H₅ | " | " | " | " |
| " | 4-COOCH(CH₃)₂ | 7-OC₄H₉—n | " | " | " | " |
| CH₃ | 3-SC₂H₅—4-CN | 7-CH₃ | " | H | " | " |
| C₆H₅ | " | " | " | " | " | " |
| " | 3-SC₂H₅—4-COOCH₃ | " | " | " | —CH₂CH₂CH₂CH₂— | " |
| " | 3-SCH₃—4-COOC₂H₅ | " | " | " | —CH₂CH₂— | " |
| " | 3-SO₂CH₃—4-COOCH₃ | " | " | " | " | " |
| " | 3-SC₆H₅—4-COOCH₃ | " | " | " | " | " |
| COCH₃ | 4-CN | " | " | " | —CH₂CH₂SO₂CH₂CH₂— | K⁺ |
| " | 4-COOCH₃ | " | " | " | —CH₂CH₂OCH₂CH₂— | " |
| CH₂CH₂OH | " | " | " | " | —CH₂CH₂SCH₂CH₂— | " |
| H | 3-CH₂CN—4-CN | " | " | " | —CH₂CH(C₆H₅)— | " |
| " | 3-CH₂CONH₂—4-CN | " | " | " | —CH₂CH(CH₃)— | " |
| " | 4-CN | " | " | " | —CH₂CH(OH)CH₂— | " |
| " | " | " | " | " | —CH₂CH(Cl)CH₂— | " |
| " | " | " | " | " | —CH₂CH(CH₂OCH₂CH₃)— | " |
| " | " | " | " | " | —CH₂CH(CH₂OC₆H₅)— | " |
| " | " | " | " | " | —CH₂CH₂N(SO₂CH₃)CH₂CH₂— | " |
| " | " | " | " | " | —CH₂CH₂CH₂NHSO₂CH₂CH₂— | " |
| " | " | " | " | " | —CH₂CH₂SO₂NHCH₂CH₂— | " |
| " | " | " | " | " | —CH₂CH₂NHCOCH₃— | " |
| " | " | " | " | " | —CH₂CH₂NHCOOCH₂CH₂— | " |
| " | " | " | " | " | —CH₂CH₂COOCH₂CH₂— | " |
| " | " | " | " | " | —CH₂CH₂CONHC₂H₄— | " |
| " | " | " | " | " | —CH₂CH₂NHCONHC₂H₄— | " |
| " | " | " | " | " | —CH₂CH₂N(SO₂C₆H₅)CH₂CH₂— | " |
| " | " | " | " | " | —CH₂CH₂N(COCH₃)CH₂CH₂— | " |
| " | " | " | " | " | —CH₂CH₂SO₂N(C₆H₅)CH₂CH₂— | " |
| " | " | " | " | " | —CH₂CH₂SO₂N(CH₃)CH₂CH₂— | " |

TABLE 12

| A | R | (R₁)$_m$ | R₃ | Z | M |
|---|---|---|---|---|---|
| H | 4-CN | 6-CH₃ | H | —CH₂CH₂— | K⁺ |
| " | " | H | " | " | " |
| CH₃ | " | " | CH₃ | " | " |

TABLE 12-continued

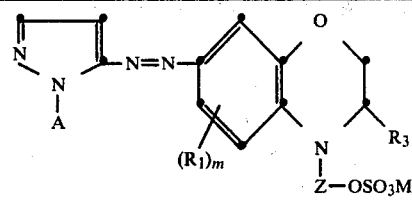

| A | R | (R₁)ₘ | R₃ | Z | M |
|---|---|---|---|---|---|
| " | 4-COOCH₃ | 6-CH₃ | " | " | " |
| " | 4-COOC₂H₄OC₂H₅ | " | " | —CH₂CH₂CH₂CH₂— | " |
| " | 4-CONH₂ | 6-OCH₃ | " | " | " |
| " | 4-CONHC₂H₄OH | " | " | —CH₂CH₂— | " |
| " | 4-CONHC₃H₆OCH₃ | 6-CH₃ | " | —CH₂CH₂OCH₂CH₂— | " |
| " | 4-CONHC₂H₄NHCOCH₃ | " | " | —CH₂CH₂SO₂CH₂CH₂— | " |
| —CH₂CH₃ | 4-CN | " | " | —CH₂CH₂SCH₂CH₂— | " |
| C₆H₅ | " | " | " | —CH₂CH(CH₃)— | " |
| " | 4-COOCH₂CH₃ | " | " | —CH₂CH(C₆H₅)— | " |
| " | 4-CONH₂ | 6-OC₂H₅ | " | —CH₂CH₂— | " |
| C₆H₄—o-Cl | " | 6-NHCOCH₃ | " | " | Na⁺ |
| H | " | 6-NHCOH | " | " | " |
| " | 4-COOCH₃ | 6-NHCOCH₂CH₂OCH₃ | " | " | " |
| " | " | 6-NHCOCH₂Cl | " | " | " |
| " | 4-CONHC₄H₉—n | 6-NHCOCH₂CN | " | " | " |
| " | " | 6-NHCOCH₂CONH₂ | " | " | " |
| " | " | 6-NHCOCH₂OC₆H₅ | " | " | " |
| SO₂CH₃ | 4-CN | 6-NHCOOC₂H₅ | " | " | " |
| " | 4-COOCH₃ | 6-NHCONHC₂H₅ | " | " | " |
| H | 3-CH₂CN—4-CN | 6-NHCOC₆H₅ | " | " | " |
| C₆H₅ | 3-SCH₃—4-CN | 6-NHCOC₆H₁₁ | " | " | " |
| " | 3-SCH₂CH₃—4-CN | 6-NHSO₂CH₃ | " | " | " |
| " | 3-SCH₂CH₃—4-COOCH₃ | 6-NHCOCH₂OCOCH₃ | " | " | " |
| " | 3-SCH₃—4-CONHC₄H₉—n | 6-NHCO-furyl | " | " | " |
| SO₂C₆H₅ | 4-CN | 6-NHCOCH₂CH₂CH₂OH | " | " | " |
| " | 4-COOCH₃ | 6-CH₃ | " | —CH₂CH₂CH₂ | " |
| SO₂C₆H₄—p-CH₃ | 4-CN | " | " | —CH₂CH₂— | " |
| SO₂C₄H₉—n | " | " | " | " | " |
| COCH₃ | " | " | " | " | " |
| COOC₂H₅ | " | " | " | " | " |
| CH₂CH₂OH | " | " | " | " | " |
| C₆H₄—o-CH₃ | " | " | " | " | " |
| " | 4-COOCH₃ | " | " | —CH₂CH(CH₃)— | " |
| " | 4-COOCH(CH₃)₂ | " | H | —CH₂CH(CH₃)— | " |
| SO₂C₆H₁₁ | " | " | CH₃ | —CH₂CH₂N(SO₂CH₃)CH₂CH₂— | K⁺ |
| H | 4-CN | " | " | —CH₂CH₂SO₂NHCH₂CH₂— | " |
| " | " | " | " | —CH₂CH₂SO₂N(CH₃)CH₂CH₂CH₂— | " |
| " | " | " | " | —CH₂CH₂SO₂N(C₆H₅)CH₂CH₂— | " |
| " | " | " | " | —CH₂CH₂SO₂N(C₆H₁₁)CH₂CH₂— | " |
| " | " | " | " | —CH₂CH₂CH₂N(SO₂CH₃)CH₂CH₂— | " |
| " | " | " | " | —CH₂CH₂N(SO₂C₆H₄—p-CH₃)CH₂CH₂— | " |
| " | " | " | " | —CH₂CH₂N(SO₂C₆H₁₁)CH₂CH₂— | " |
| C₆H₅ | " | " | " | —CH₂CH(Cl)CH₂— | " |
| " | " | " | " | —CH₂CH(OH)CH₂— | " |
| " | " | " | " | —CH₂CH(CH₂OCH₃)— | " |
| " | " | " | " | —CH₂CH(CH₂OC₆H₅)— | " |
| " | " | " | " | —CH₂CH(OCOCH₃)CH₂— | " |
| " | " | " | " | —CH₂CH₂NHCOCH₂— | " |
| " | " | " | " | —CH₂CH₂CONHC₂H₄— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂NHCONHCH₂CH₂— | " |
| " | " | " | " | —CH₂CH₂N(COCH₃)CH₂CH₂— | " |
| " | " | " | " | —CH₂CH₂N(COC₆H₅)CH₂CH₂— | " |

TABLE 13

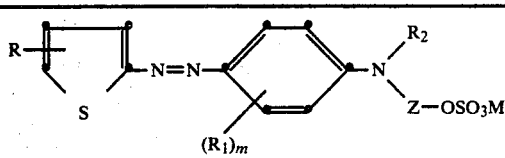

| R | (R₁)ₘ | R₂ | Z | M |
|---|---|---|---|---|
| 3,5-di-CN—4-CH₃ | 2-CH₃ | H | —CH₂CH₂— | K⁺ |

TABLE 13-continued

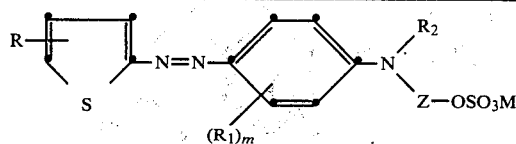

| R | $(R_1)_m$ | $R_2$ | Z | M |
|---|---|---|---|---|
| " | 2-Cl | " | " | " |
| " | 2,5-di-Cl | " | " | " |
| " | 2,5-di-CH$_3$ | " | " | " |
| 3-CN—5-C$_6$H$_5$ | 2,5-di-OCH$_3$ | " | " | " |
| 3-COOCH$_3$—5-C$_6$H$_5$ | 3-OCH$_3$ | —C$_2$H$_5$ | " | " |
| 3-CONH$_2$—5-C$_6$H$_5$ | 2-OCH$_3$, 5-NHCOCH$_3$ | H | " | " |
| 3-CONHC$_2$H$_5$—5-C$_6$H$_5$ | 2-CH$_3$, 3-Cl | " | " | " |
| 3-COOCH$_3$ | 2-OCH$_3$, 5-Cl | " | " | " |
| 3-CN | 3-NHCOCH$_3$ | —C$_2$H$_5$ | " | " |
| 3-CN—4-CH$_3$—5-COOC$_2$H$_5$ | 3-NHCOC$_2$H$_5$ | —C$_2$H$_4$OCH$_3$ | " | " |
| " | 3-NHCOCH$_2$OH | —CH$_2$C$_6$H$_5$ | " | " |
| " | 3-NHCOCH$_2$OCH$_3$ | —C$_6$H$_{11}$ | " | " |
| " | 3-NHCOC$_6$H$_5$ | —CH$_2$C$_6$H$_{11}$ | " | " |
| 3-CN—4-CH$_3$—5-COCH$_3$ | 3-NHCOOC$_2$H$_5$ | —CH$_2$CH$_2$OC$_6$H$_5$ | " | " |
| 3-COOCH$_3$—4-CH$_3$—5-CN | 3-NHCONHC$_2$H$_5$ | —CH$_2$CH$_2$OH | " | " |
| 3-COOCH$_3$—4-CH$_3$—5-COC$_6$H$_5$ | 3-NHCOC$_6$H$_{11}$ | —CH$_2$CN(CH$_3$)$_2$ | " | " |
| 3-COOCH$_3$—5-COC$_6$H$_5$ | 3-NHCOCH$_2$CN | —CH$_2$CH$_2$CH$_2$CH$_3$ | " | " |
| 3-COOCH$_3$—5-COCH(CH$_3$)$_2$ | 3-NHCOCH$_2$OC$_6$H$_5$ | —CH$_2$CH$_2$OCOCH$_3$ | " | " |
| " | 3-NHCOCH$_2$C$_6$H$_5$ | —CH$_2$CH$_2$CONH$_2$ | " | " |
| " | 3-CH$_3$ | —CH$_2$CH$_2$NHCOCH$_3$ | " | " |
| " | " | —CH$_2$CH$_2$NHSO$_2$CH$_3$ | " | " |
| " | " | —CH$_2$CH$_2$SO$_2$NH$_2$ | " | " |
| " | " | —CH$_2$CH$_2$CH$_2$SO$_2$CH$_3$ | " | " |
| 3-SO$_2$C$_6$H$_5$—5-COCH$_3$ | " | —CH$_2$CH$_2$SCH$_3$ | " | " |
| 3-SO$_2$CH$_3$—5-CN | " | —CH$_2$CH$_2$N(COCH$_2$)(COCH$_2$) | —CH$_2$CH$_2$CH$_2$— | Na$^+$ |
| 3-SO$_2$C$_6$H$_5$—5-Br | " | —CH$_2$CH$_2$CH$_2$N(CO—CH$_2$)(CH$_2$CH$_2$) | " | " |
| 3,5-di-SO$_2$CH$_3$ | 3-OC$_6$H$_5$ | —CH$_2$CH$_2$N(CO)(CO)C$_6$H$_4$ | " | NH$_4^+$ |
| 3,5-di-SO$_2$NH$_2$ | 3-CH$_3$ | —C$_6$H$_5$ | —CH$_2$CH$_2$— | Na$^+$ |
| 3,5-di-SO$_2$N(C$_2$H$_5$)$_2$ | " | —CH$_2$-oxetane | —CH$_2$CH(CH$_2$OC$_6$H$_5$)— | " |
| 3-CN—5-COCH$_3$ | " | —CH$_2$CH$_2$COOCH$_3$ | —CH$_2$CH(C$_6$H$_5$)— | " |
| 3-CN—5-COCH(CH$_3$)$_2$ | " | —CH$_2$CH$_2$CN | —CH$_2$CH(CH$_3$)— | " |
| 3-CN—S—COOC$_2$H$_5$ | " | —C$_2$H$_5$ | —CH$_2$CH(OH)CH$_2$— | " |
| 3-CONH$_2$—5-COOC$_2$H$_5$ | 2-CH$_3$S | H | —CH$_2$CH$_2$CH$_2$CH$_2$— | " |
| 3-CONH$_2$—5-COCH(CH$_3$)$_2$ | 3-CH$_3$ | —C$_2$H$_4$OC$_2$H$_4$OC$_2$H$_5$ | —CH$_2$CH(OCOCH$_3$)CH$_2$— | " |
| 3-CONHC$_2$H$_4$OH—5-COCH(CH$_3$)$_2$ | " | —CH$_2$CH(OH)CH$_2$Cl | —CH$_2$CH$_2$— | " |
| " | 2-OCH$_3$, 5-CH$_3$ | —C$_2$H$_5$ | " | " |
| " | " | H | —CH$_2$CH$_2$OCH$_2$CH$_2$— | " |
| " | " | H | —CH$_2$CH$_2$SO$_2$CH$_2$CH$_2$— | K$^+$ |
| 3-CONHC$_3$H$_6$OCH$_3$—S—COCH(CH$_3$)$_2$ | 3-CH$_3$ | C$_2$H$_5$ | —CH$_2$CH$_2$SCH$_2$CH$_2$— | " |
| 3-CONHC$_4$H$_9$—n-5-COCH(CH$_3$)$_2$ | " | " | —CH$_2$CH$_2$N(SO$_2$CH$_3$)CH$_2$CH$_2$— | " |
| 3-CONCHC$_2$H$_4$OH—5-COCH(CH$_3$)$_2$ | " | " | —CH$_2$CH$_2$NHSO$_2$CH$_2$CH$_2$CH$_2$CH$_2$— | " |
| 3-COOCH$_3$—5-SO$_2$CH$_3$ | " | " | —CH$_2$CH$_2$SO$_2$NHCH$_2$CH$_2$— | " |
| 3-CONHC$_2$H$_5$—5-SO$_2$CH$_3$ | " | " | —CH$_2$CH$_2$N(COCH$_3$)CH$_2$CH$_2$— | " |
| 3-CONH$_2$—5-SO$_2$CH$_3$ | " | " | —CH$_2$CH$_2$CONHC$_2$H$_4$— | " |
| 3-CONH$_2$—5-SO$_2$C$_4$H$_9$—n | " | " | —CH$_2$CH$_2$NHCOCH$_2$— | " |
| 3-COOCH$_3$—4-CH$_3$—5-SCN | " | " | —CH$_2$CH$_2$N(SO$_2$C$_6$H$_5$)CH$_2$CH$_2$— | " |
| 3-CHO—4-CH$_3$ | " | " | —CH$_2$CH$_2$SO$_2$N(CH$_3$)CH$_2$CH$_2$— | " |
| 3-CONH$_2$—5-C$_6$H$_4$-p-CH$_3$ | " | " | —CH$_2$CH$_2$SO$_2$N(C$_6$H$_5$)CH$_2$CH$_2$— | " |
| 3-CN—5-COOC$_2$H$_5$ | " | " | —CH$_2$CH$_2$N(SO$_2$C$_6$H$_{11}$)CH$_2$CH$_2$— | " |
| 3-COOCH$_3$—5-COCH(CH$_3$)$_2$ | " | " | —CH$_2$CH$_2$N(COCH$_3$)CH$_2$CH$_2$— | " |
| " | " | " | —CH$_2$CH(CH$_2$OCH$_3$)— | " |
| " | " | " | —CH$_2$CH(Cl)CH$_2$— | " |
| " | " | " | —CH$_2$CH$_2$NHCONHC$_2$H$_4$— | " |
| " | " | " | —CH$_2$CH$_2$NHCOOCH$_2$CH$_2$— | " |
| " | " | " | —CH$_2$CH$_2$COOCH$_2$CH$_2$— | " |

TABLE 14

[Structure: R-substituted thiophene connected via N=N to a benzene ring bearing (R₁)ₘ, linked to a fused ring system with R₃, R₄ substituents and N-ZOSO₃M group]

| R | (R₁)ₘ | R₃ | R₄ | Z | M |
|---|---|---|---|---|---|
| 3-CONHC₂H₅—5-COCH(CH₃)₂ | H | CH₃ | CH₃ | —CH₂CH₂— | K⁺ |
| " | 7-CH₃ | " | " | " | " |
| 3-CONH₂—5-COCH(CH₃)₂ | 7-OCH₃ | " | " | " | " |
| " | 7-Cl | " | " | " | " |
| " | 5-CH₃, 8-OCH₃ | " | " | " | " |
| " | 5,8-di-OCH₃ | " | " | " | " |
| " | 5,8-di-CH₃ | " | " | " | " |
| " | 5-Cl, 8-OCH₃ | " | " | " | " |
| " | 8-OCH₃ | " | " | " | " |
| " | 8-OC₂H₅ | H | H | " | " |
| " | 7-CH₃ | " | " | " | " |
| 3-COOCH₃—5-COCH(CH₃)₂ | 7-NHCOCH₃ | CH₃ | CH₃ | " | Na⁺ |
| " | 7-NHCOH | " | " | " | " |
| " | 7-NHCOCH₂OCH₃ | " | " | " | " |
| " | 7-NHCOCH₂OC₆H₅ | H | CH(CH₃)₂ | " | " |
| " | 7-NHCOCH₂C₆H₅ | " | " | " | " |
| 3,5-di-CN—4-CH₃ | 7-NHCOCH₂Cl | " | " | " | " |
| " | 7-NHCOC₆H₅ | " | " | " | " |
| " | 7-NHCOC₆H₁₁ | CH₃ | CH₃ | " | " |
| " | 7-NHCONHC₂H₅ | " | " | " | " |
| " | 7-NHSO₂CH₃ | " | " | " | " |
| 3-CONH₂—5-C₆H₅ | 7-NHCOCH₂CN | " | " | " | " |
| " | 7-NHCOCH₂OH | " | " | " | " |
| 3-COOCH₃—5-C₆H₅ | 7-NHCOOC₂H₅ | " | " | —CH₂CH₂CH₂— | " |
| 3-COOCH₃—5-COCH₃ | 7-NHCOCH₂CH₂OCOCH₃ | " | " | " | " |
| 3-CN—5-COOC₂H₅ | 8-OC₄H₉—n | H | CH₃ | —CH₂CH₂— | " |
| 3-CN—4-CH₃—5-COOC₂H₅ | 7-CH₃ | CH₃ | H | " | " |
| 3-CN—4-CH₃—5-COCH₃ | 7-NHCO-[furan] | " | CH₃ | " | " |
| 3-COOCH₃—4-CH₃—5-CN | 7-OC₂H₅ | " | " | " | " |
| 3-CN—4-CH₃—5-CO₂CH₂CH₂OC₂H₅ | 7-OC₄H₉—n | " | " | " | " |
| 3-SO₂C₆H₅—5-COCH₃ | 7-CH₃ | " | H | " | " |
| 3-SO₂C₆H₄—p-Cl—5-COCH₃ | " | " | " | " | " |
| 3-SO₂CH₃—5-CN | " | " | " | —CH₂CH₂CH₂CH₂— | " |
| 3-COOCH₃—5-Br | " | " | " | —CH₂CH₂— | " |
| 3-COOCH₃—5-SCN | " | " | " | " | " |
| 3-CONHC₂H₄OH—5-COCH(CH₃)₂ | " | " | " | " | " |
| 3-CONHC₃H₆OCH₃—5-COCH(CH₃)₂ | " | " | " | —CH₂CH₂SO₂CH₂CH₂— | K⁺ |
| 3-CN—5-SO₂CH₃ | " | " | " | —CH₂CH₂OCH₂CH₂— | " |
| 3,5-di-SO₂NH₂ | " | " | " | —CH₂CH₂SCH₂CH₂— | " |
| 3,5-di-SO₂NHC₂H₅ | " | " | " | —CH₂CH(C₆H₅)— | " |
| 3-COOCH₃—5-COC₆H₅ | " | " | " | —CH₂CH(CH₃)— | " |
| 3-CONHC₄H₉—n-5-COC₆H₅ | " | " | " | —CH₂CH(OH)CH₂— | " |
| 3-COOCH₃—5-SO₂CH₃ | " | " | " | —CH₂CH(Cl)CH₂— | " |
| 3-CONHC₂H₄OH—5-SO₂CH₃ | " | " | " | —CH₂CH(CH₂OCH₂CH₃)— | " |
| 3-CHO | " | " | " | —CH₂CH(CH₂OC₆H₅)— | " |
| 3-SO₂C₆H₅ | " | " | " | —CH₂CH₂N(SO₂CH₃)CH₂CH₂— | " |
| 3-CONHC₂H₅—5-COCH(CH₃)₂ | " | " | " | —CH₂CH₂CH₂NHSO₂CH₂CH₂— | " |
| " | " | " | " | —CH₂CH₂SO₂NHCH₂CH₂— | " |
| " | " | " | " | —CH₂CH₂NHCOCH₂— | " |
| " | " | " | " | —CH₂CH₂NHCOOCH₂CH₂— | " |
| " | " | " | " | —CH₂CH₂COOCH₂CH₂— | " |
| " | " | " | " | —CH₂CH₂CONHC₂H₄— | " |
| " | " | " | " | —CH₂CH₂NHCONHC₂H₄— | " |
| " | " | " | " | —CH₂CH₂N(SO₂C₆H₅)CH₂CH₂— | " |
| " | " | " | " | —CH₂CH₂N(COCH₃)CH₂CH₂— | " |
| 3-COOCH₃—4-CH₃—5-CONH₂ | " | " | " | —CH₂CH₂SO₂N(C₆H₅)CH₂CH₂— | " |
| " | " | " | " | —CH₂CH₂SO₂N(CH₃)CH₂CH₂— | " |

TABLE 15

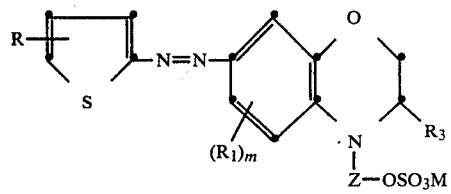

| R | $(R_1)_m$ | $R_3$ | Z | M |
|---|---|---|---|---|
| 3-COOCH₃—5-COCH(CH₃)₂ | 6-CH₃ | H | —CH₂CH₂— | K⁺ |
| 3-CONH₂—5-COCH(CH₃)₂ | H | H | " | " |
| 3-CN—5-COCH(CH₃)₂ | " | CH₃ | " | " |
| " | 6-CH₃ | " | " | " |
| 3-CONH₂—5-C₆H₅ | " | " | —CH₂CH₂CH₂CH₂— | " |
| " | 6-OCH₃ | " | " | " |
| " | " | " | —CH₂CH₂— | " |
| 3-CN—5-C₆H₅ | 6-CH₃ | " | —CH₂CH₂OCH₂CH₂— | " |
| 3-CONHC₂H₄OH—5-C₆H₅ | " | " | —CH₂CH₂SO₂CH₂CH₂— | " |
| 3-CONHC₂H₅—5-COC₆H₅ | " | " | —CH₂CH₂SCH₂CH₂— | " |
| 3-CONHCH₃—5-COC₆H₅ | " | " | —CH₂CH(CH₃) | " |
| 3-CN—4-CH₃—5-COOC₂H₅ | " | " | —CH₂CH(C₆H₅)— | " |
| 3-CN—4-CH₃—5-COOC₂H₄OCH₃ | 6-OC₂H₅ | " | —CH₂CH₂— | " |
| 3-CHO—4,5-di-CH₃ | 6-NHCOCH₃ | " | " | Na⁺ |
| 3-CN—4-CH₃—5-SCH₃ | 6-NHCOH | " | " | " |
| 3-COOCH₃—4-CH₃—5-CONH₂ | 6-NHCOCH₂CH₂OCH₃ | " | " | " |
| 3-CONH₂—4-CH₃—5-CN | 6-NHCOCH₂Cl | " | " | " |
| 3,5-di-CN—4-CH₃ | 6-NHCOCH₂CN | " | " | " |
| " | 6-NHCOCH₂CONH₂ | " | " | " |
| " | 6-NHCOCH₂OC₆H₅ | " | " | " |
| " | 6-NHCOOC₂H₅ | " | " | " |
| 3-CONH₂—4-CH₃—5-COOCH₃ | 6-NHCONHC₂H₅ | " | " | " |
| 3-SO₂CH₃—5-COCH₃ | 6-NHCOC₆H₅ | " | " | " |
| 3-SO₂C₆H₅—5-COCH₃ | 6-NHCOC₆H₁₁ | " | " | " |
| 3-SO₂C₆H₄—p-Cl—5-COCH₃ | 6-NHSO₂CH₃ | " | " | " |
| 3-SO₂CH₃—5-Br | 6-NHCOCH₂CH₂OCOCH₃ | " | " | " |
| 3,5-di-SO₂CH₃ | 6-NHCO—(furyl) | " | " | " |
| 3,5-di-SO₂NH₂ | 6-NHCOCH₂CH₂CH₂OH | " | " | " |
| 3,5-di-SO₂NHC₂H₅ | 6-CH₃ | " | —CH₂CH₂CH₂— | " |
| 3-CONHC₂H₄OH—5-COCH(CH₃)₂ | " | " | —CH₂CH₂— | " |
| 3-CONHC₃H₆OCH₃—5-COCH(CH₃)₂ | " | " | " | " |
| 3-CONHC₂H₄NHCOCH₃ | " | " | " | " |
| 3-CONHC₄H₉—n-5-C₆H₅ | " | " | " | " |
| 3-CN—5-COOC₂H₅ | " | " | " | " |
| 3-CN—4-CH₃—5-COOCH(CH₃)₂ | " | " | " | " |
| 3-CN—4-CH₃—5-CONHC₂H₅ | " | " | " | " |
| 3-CN—4-CH₃—5-CONHC₆H₅ | " | H | —CH₂CH(CH₃)— | " |
| 3-CONH₂—5-SO₂CH₃ | " | CH₃ | —CH₂CH₂N(SO₂CH₃)CH₂CH₂— | K⁺ |
| 3-CONH₂—5-COCH(CH₃)₂ | " | " | —CH₂CH₂SO₂NHCH₂CH₂— | " |
| " | " | " | —CH₂CH₂SO₂N(CH₃)CH₂CH₂CH₂— | " |
| " | " | " | —CH₂CH₂SO₂N(C₆H₅)CH₂CH₂— | " |
| " | " | " | —CH₂CH₂SO₂N(C₆H₁₁)CH₂CH₂— | " |
| " | " | " | —CH₂CH₂CH₂CH₂N(SO₂CH₃)CH₂CH₂— | " |
| " | " | " | —CH₂CH₂N(SO₂C₆H₄—p-CH₃)—CH₂CH₂— | " |
| 3-CONHC₂H₅—5-COCH(CH₃)₂ | " | " | —CH₂CH₂N(SO₂C₆H₁₁)CH₂CH₂— | " |
| " | " | " | —CH₂CH(Cl)CH₂— | " |
| " | " | " | —CH₂CH(OH)CH₂— | " |
| " | " | " | —CH₂CH(CH₂OCH₃)— | " |
| " | " | " | —CH₂CH(CH₂OC₆H₅)— | " |
| " | " | " | —CH₂CH(OCOCH₃)CH₂— | " |
| " | " | " | —CH₂CH₂NHCOCH₂— | " |
| " | " | " | —CH₂CH₂CONHC₂H₄— | " |
| " | " | " | —CH₂CH₂NHCOOCH₂CH₂— | " |
| " | " | " | —CH₂CH₂COOCH₂CH₂— | " |
| " | " | " | —CH₂CH₂NHCONHCH₂CH₂— | " |
| " | " | " | —CH₂CH₂N(COCH₃)CH₂CH₂— | " |
| " | " | " | —CH₂CH₂N(COC₆H₅)CH₂CH₂— | " |

EXAMPLES 11–20

Diazotization of 5-Amino-3-ethylthio-1,2,4-thiadiazole

5-Amino-3-ethylthio-1,2,4-thiadiazole (8.05 g., 0.05 m) is diazotized exactly as described in Examples 28–37 and a 0.005 m aliquot coupled to 0.005 m portion of the couplers of Examples 1–10 in the manner previously illustrated.

EXAMPLES 21–30

Diazotization of 5-Amino-3-methyl-4-cyanoisothiazole

To 25 ml of concentrated H₂SO₄ is added 3.6 g. of NaNO₂ allowing the temperature to rise. The solution is cooled and 50 ml of 1:5 acid is added below 10° C. Stirring is continued and 6.95 g (0.05 m) of 5-amino-3-methyl-4-cyanoisothiazole is added below 5° C., followed by an additional 50 ml of 1:5 acid. After stirring at 0°–5° C. for 2 hrs., a 0.005 m aliquot of the diazonium salt is coupled to 0.005 m of the couplers of Examples 1–10 as previously described to produce rubine to violet dyes for polyamides.

EXAMPLES 41–50

Diazotization of 5-Amino-4-carbomethoxypyrazole

Nitrosyl sulfuric acid is prepared by adding 3.6 g. NaNO₂ to 25 ml of concentrated H₂SO₄. The solution is cooled and 100 ml of L;5 acid is added below 20°. C. After further cooling, 5-amino-4-carbomethoxypyrazole (7.05 g., 0.05 m) is added at 0°–5° C. and stirring continued for 2 hrs. A 0.005 m aliquot of the diazonium solution is coupled to 0.005 m. of the couplers of Examples 1–10 in the manner previously described to produce red dyes for polyamides.

EXAMPLES 51–60

Diazotization of 2-Amino-3-carbomethoxy-5-isobutyrylthiophene

To 150 g. of 60% aqueous acetic acid is added 11.35 g. (0.05 m) of 2-amino-3-carbomethoxy-5-isobutyrylthiophene at room temperature. Ten grams of concentrated onc. H₂SO₄ is added and the mixture cooled to 0° C. A solution of 3.6 g NaNO₂ in 25 ml of conc. H₂SO₄ is added below 10° C. and stirring continued for 1 hr. at 0°–5° C. A 0.005 m aliquot of this diazonium salt is coupled to 0.005 m portions of the couplers of Examples 1–10 as previously illustrated to produce violet to reddish-blue dyes for polyamides.

We claim:

1. A compound of the formulae D—N=N—Coupler, wherein D is selected from the heterocyclic amines of the formula

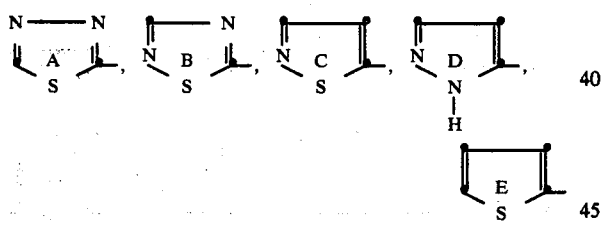

ring A may bear a substituent selected from lower alkyl, substituted lower alkyl, lower alkoxy, halogen, lower alkylsulfonyl, SO₂O aryl, SO₂NH₂, SO₂NH—lower alkyl, SO₂N—(dilower alkyl), arylsulfonyl, substituted SO₂NH—lower alkyl, acylamido, aryl, arylthio, alkenylthio, cyclohexylthio, thiocyano, cyclohexylsulfonyl, lower alkylthio, substituted lower alkylthio and cyclohexyl;

ring B may bear a substituent selected from lower alkyl, substituted lower alkyl, aryl, lower alkylthio, cyclohexylthio, substituted lower alkylthio and lower alkylsulfonyl;

ring C may bear one or two substituents selected from alkyl, substituted lower alkyl, halogen, cyano, carbamoyl, CONH—lower alkyl, substituted CONH—lower alkyl, lower alkoxycarbonyl, lower alkylthio, substituted lower alkylthio, alkenylthio, arylthio, cyclohexylthio, S-heterocycle, aryloxy, and lower alkoxy;

ring D may bear one or two substituents selected from lower alkyl, substituted lower alkyl, lower alkoxycarbonyl, lower alkylthio, aryl, cyano, carbamoyl, lower alkyl carbamoyl, lower alkylcarbonyl, substituted lower alkyl carbamoyl, and lower alkyl sulfonyl; and ring E may be substituted with one to three substituents selected from lower alkyl, substituted lower alkyl, cyano, lower alkoxycarbonyl, acyl, aroyl, lower alkylsulfonyl, arylsulfonyl, carbamoyl, lower alkyl carbamoyl, substituted lower alkyl carbamoyl, aryl, halogen, sulfamoyl, lower alkyl carbamoyl, substituted lower alkyl, sulfamoyl and formyl;

and wherein the various alkyl groups may bear one to three substituents selected from hydroxy, lower alkoxy, aryl, aryloxy, cyclohexyl, lower alkylcyclohexyl, acyloxy, lower alkoxy carbonyl, acylamido, lower alkylsulfonamido, succinimido, glutarimido, phthalimido, 2-pyrrolidono, cyano, carbamoyl, lower alkoxy-alkoxy, lower alkylthio, halogen, arylthio, lower alkylsulfonyl and arylsulfonyl;

and wherein the various aryl groups may be substituted with one to three substituents selected from lower alkyl, lower alkoxy, halogen, lower alkoxy carbonyl, lower alkyl sulfonyl, and lower alkylthio; and the Coupler is selected from those of the formulae

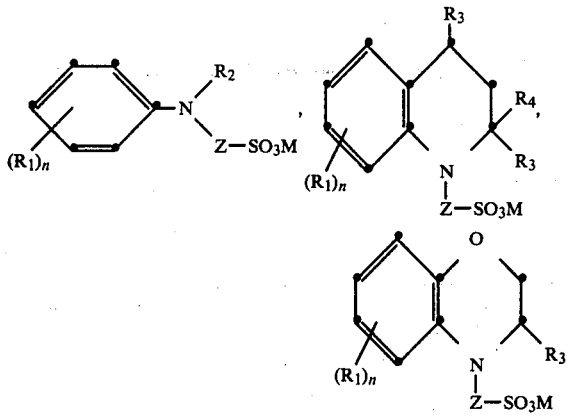

wherein R₁ is selected from hydrogen, lower alkyl, halogen, lower alkoxy, aryloxy, and —NHCO—R₅ or —NHSO₂—R₅ wherein R₅ is selected from lower alkyl which may be substituted with hydroxy, lower alkoxy, cyano, aryloxy, aryl, halogen, cycloalkyl, lower alkyl carbonyloxy, or carbamoyl; hydrogen; aryl; alkoxy; alkylamine; 2-furyl; R₂ is selected from hydrogen, aryl, cycloalkyl, and lower alkyl which may be substitued —SO₃M with alkoxy, alkoxyalkoxy, hydrogen, aryloxy, aryl, cycloalkyl, lower alkylcycloalkyl, furyl, NHCOR₅, NHSO₂R₅, aryloxy, carbamoyl, lower alkyl carbamoyl, lower alkyl substituted carbamoyl, cyano, alkanoyloxy, halogen, alkoxycarbonyl, succinimido, glutarimido, phthalimido, 2-pyrrolidono, sulfamoyl, lower alkyl substituted sulfamoyl, lower alkylsulfonamide, NHSO₂—aryl, NHCOO—alkyl, NHCONH—alkyl, formamido, alkylsulfonyl, arylsulfonyl, alkylthio, or arylthio; R₂ may in conjunction with R₁ form a 1,2,3,4-tetrahydroquinoline or benzomorpholine derivative; n is 0, 1 or 2; M is Na⁺, K⁺, NH₄⁺, or H⁺; R₃ and R₄ are each selected from hydrogen or lower alkyl;

Z is selected from straight or branched chain lower alkylene, lower alkylene substituted with aryl, aryloxy, alkoxy, halogen, aryloxy or SO$_3$M, —CH$_2$(CH$_2$)$_{\overline{m}}$X—CH$_2$(CH$_2$)$_p$, where m is 1, 2, or 3, p is 0, 1, 2 or 3, and X is O, S, SO$_2$, —SO$_2$NH—, —SO$_2$N|—alkyl, —N|—SO$_2$—alkyl, —N|—SO$_2$—aryl, —N|—SO$_2$—cyclohexyl, —NCO|—alkyl,
$\phantom{xxxxxxxxxxxxxxxxxxxxxxxx}$alkyl$\phantom{xxxxxx}$aryl
—NHCO—, —NHCOO—, —N|—CO—, —N|—SO$_2$—,
$$\phantom{xxxxxxxxxxxxxxxxxxxxxxxxxx}\overset{O}{\underset{\|}{\phantom{x}}}$$
or —NHCNH—;

and the various aryl groups may be substituted with lower alkyl, lower alkoxy, or halogen.

2. A compound according to claim 1 where R$_1$ is selected from hydrogen, lower alkyl, and lower alkoxy; R$_2$ is selected from hydrogen or lower alkyl; and Z is straight or branched chain lower alkylene.

3. A compound according to claim 1 having the formula

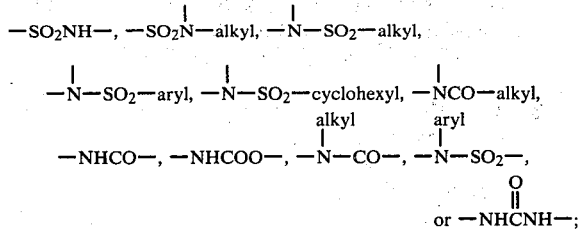

4. A compound according to claim 1 having the formula

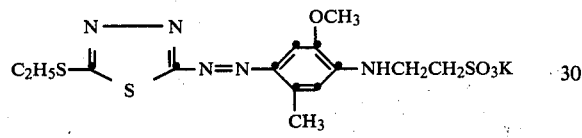

5. A compound according to claim 1 having the formula

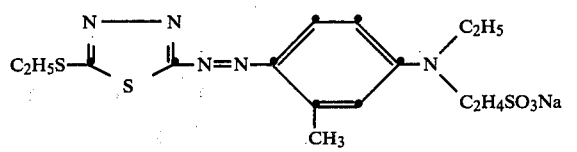

6. A compound according to claim 1 having the formula

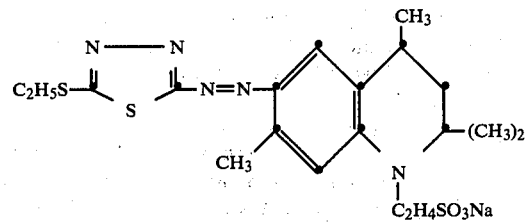

7. A compound according to claim 1 having the formula

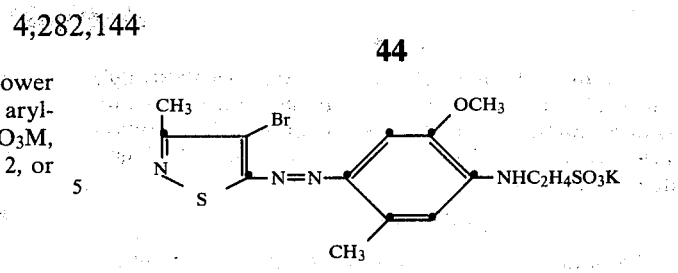

8. A compound according to claim 1 having the formula

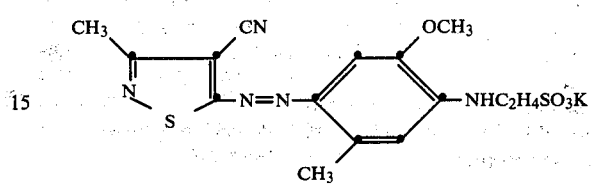

9. A compound according to claim 1 having the formula

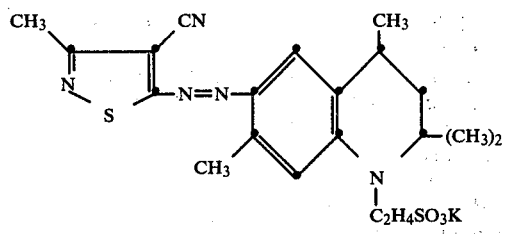

10. A compound according to claim 1 having the formula

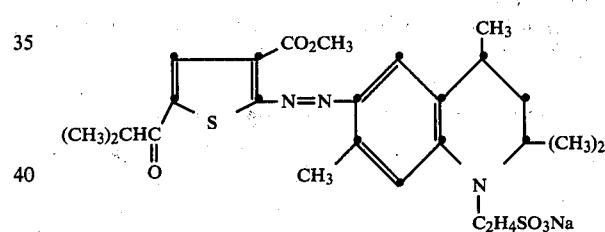

11. A compound according to claim 1 having the formula

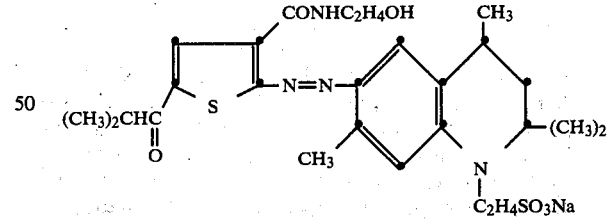

12. A compound according to claim 1 having the formula

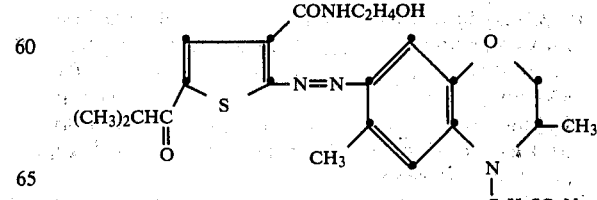

* * * * *